US008527349B2

(12) United States Patent
Colson et al.

(10) Patent No.: US 8,527,349 B2
(45) Date of Patent: *Sep. 3, 2013

(54) METHODS, APPARATUS AND COMPUTER PROGRAM PRODUCTS FOR TARGETED AND CUSTOMIZED MARKETING OF VEHICLE CUSTOMERS

(75) Inventors: Charles Richard Colson, Weddington, NC (US); Rafael A. Duluc, Charlotte, NC (US)

(73) Assignee: HCD Software, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/294,804

(22) Filed: Nov. 11, 2011

(65) Prior Publication Data

US 2012/0059725 A1    Mar. 8, 2012

Related U.S. Application Data

(63) Continuation of application No. 12/626,013, filed on Nov. 25, 2009.

(60) Provisional application No. 61/155,388, filed on Feb. 25, 2009.

(51) Int. Cl.
*G06Q 30/00* (2012.01)
*G06Q 10/00* (2012.01)

(52) U.S. Cl.
USPC ............. 705/14.67; 705/14.73; 705/14.72; 705/14.66; 705/14.57; 705/14.49; 705/14.46; 705/22; 705/26.7; 705/26.63; 705/306; 705/307

(58) Field of Classification Search
None
See application file for complete search history.

(56) References Cited

U.S. PATENT DOCUMENTS

| | | | |
|---|---|---|---|
| 5,493,490 A | * | 2/1996 | Johnson ............ 705/26.4 |
| 5,500,793 A | | 3/1996 | Deming et al. |
| 5,664,115 A | | 9/1997 | Fraser |
| 5,724,573 A | | 3/1998 | Agrawal et al. |
| 5,774,883 A | | 6/1998 | Andersen et al. |
| 5,884,305 A | | 3/1999 | Kleinberg et al. |
| 5,893,075 A | | 4/1999 | Plainfield et al. |
| 5,930,764 A | | 7/1999 | Melchione et al. |
| 5,933,818 A | | 8/1999 | Kasravi et al. |
| 5,940,812 A | | 8/1999 | Tengel et al. |
| 5,966,695 A | | 10/1999 | Melchione et al. |
| 6,023,687 A | | 2/2000 | Weatherly et al. |

(Continued)

OTHER PUBLICATIONS

Morton, Fiona Scott et al. *Internet Car Retailing*. 34 pages. Sep. 2000.

*Primary Examiner* — John G Weiss
*Assistant Examiner* — Vincent Cao
(74) *Attorney, Agent, or Firm* — Moore & Van Allen, PLLC; James C. Edwards

(57) ABSTRACT

Methods, systems and computer program products for targeted and customized marketing to customers and, specifically in some embodiments, customers having a previous relationship with the entity implementing the marketing tool. The embodiments of the invention herein disclosed provide for efficient identification of previous customers based on their current product, service or property and/or their previous, and in some instances, ongoing financial obligation related to the current product, service or property. A replacement product, service or property is identified and a financial transaction proposal, such as a sales or lease proposal, is generated for one or more of the identified previous customers based on customers meeting criteria associated with variable parameters of the proposed transaction.

24 Claims, 16 Drawing Sheets

(56) References Cited

U.S. PATENT DOCUMENTS

| | | | |
|---|---|---|---|
| 6,026,370 A | 2/2000 | Jermyn | |
| 6,041,310 A * | 3/2000 | Green et al. | 705/26.41 |
| 6,061,682 A | 5/2000 | Agrawal et al. | |
| 6,161,103 A | 12/2000 | Rauer et al. | |
| 6,236,978 B1 | 5/2001 | Tuzhilin | |
| 6,266,668 B1 | 7/2001 | Vanderveldt et al. | |
| 6,285,983 B1 | 9/2001 | Jenkins | |
| 6,332,126 B1 | 12/2001 | Peirce et al. | |
| 6,334,110 B1 | 12/2001 | Walter et al. | |
| 6,418,419 B1 | 7/2002 | Nieboer et al. | |
| 6,629,095 B1 | 9/2003 | Wagstaff et al. | |
| 6,925,411 B1 | 8/2005 | Drost et al. | |
| 6,965,874 B2 | 11/2005 | Joseph | |
| 7,065,555 B2 | 6/2006 | Foulger et al. | |
| 7,072,848 B2 * | 7/2006 | Boyd et al. | 705/14.1 |
| 7,177,822 B2 | 2/2007 | Mahmood et al. | |
| 7,213,023 B2 | 5/2007 | Hadzikadic et al. | |
| 7,216,102 B2 | 5/2007 | Nabe | |
| 7,305,364 B2 | 12/2007 | Nabe et al. | |
| 7,386,485 B1 | 6/2008 | Mussman et al. | |
| 7,386,594 B2 | 6/2008 | Foulger et al. | |
| 7,392,221 B2 | 6/2008 | Nabe et al. | |
| 7,406,436 B1 | 7/2008 | Reisman | |
| 7,472,072 B2 | 12/2008 | Kowalchuk | |
| 7,483,846 B1 * | 1/2009 | Kumar et al. | 705/26.43 |
| 7,487,110 B2 | 2/2009 | Bennett | |
| 7,555,443 B2 | 6/2009 | Chandran et al. | |
| 7,827,099 B1 | 11/2010 | Cotton | |
| 8,005,752 B1 | 8/2011 | Cotton | |
| 8,086,529 B2 | 12/2011 | Cotton | |
| 8,095,461 B2 | 1/2012 | Cotton | |
| 2001/0044769 A1 | 11/2001 | Chaves | |
| 2001/0049653 A1 * | 12/2001 | Sheets | 705/38 |
| 2002/0010643 A1 | 1/2002 | Chaves | |
| 2002/0013711 A1 | 1/2002 | Ahuja et al. | |
| 2002/0035520 A1 | 3/2002 | Weiss | |
| 2002/0042752 A1 | 4/2002 | Chaves | |
| 2002/0065707 A1 | 5/2002 | Lancaster | |
| 2002/0099618 A1 | 7/2002 | Stiberman | |
| 2002/0103715 A1 | 8/2002 | Bennett | |
| 2002/0188506 A1 * | 12/2002 | Smith | 705/14 |
| 2002/0194050 A1 * | 12/2002 | Nabe et al. | 705/10 |
| 2002/0198820 A1 | 12/2002 | Mills | |
| 2003/0154129 A1 * | 8/2003 | Goff | 705/14 |
| 2003/0172016 A1 | 9/2003 | Chandran et al. | |
| 2003/0212619 A1 * | 11/2003 | Jain et al. | 705/35 |
| 2003/0229528 A1 | 12/2003 | Nitao et al. | |
| 2004/0039690 A1 | 2/2004 | Brown et al. | |
| 2004/0167897 A1 | 8/2004 | Kuhlmann et al. | |
| 2005/0165639 A1 * | 7/2005 | Ross et al. | 705/14 |
| 2006/0004626 A1 * | 1/2006 | Holmen et al. | 705/14 |
| 2006/0064340 A1 * | 3/2006 | Cook | 705/10 |
| 2006/0085283 A1 * | 4/2006 | Griffiths | 705/26 |
| 2006/0155439 A1 * | 7/2006 | Slawinski et al. | 701/35 |
| 2007/0129954 A1 * | 6/2007 | Dessureault | 705/1 |
| 2007/0179798 A1 | 8/2007 | Inbarajan | |
| 2007/0282712 A1 * | 12/2007 | Ullman et al. | 705/27 |
| 2008/0120155 A1 | 5/2008 | Pliha | |
| 2008/0183616 A1 * | 7/2008 | Hankey et al. | 705/38 |
| 2008/0201163 A1 * | 8/2008 | Barker et al. | 705/1 |
| 2008/0288332 A1 | 11/2008 | Altounian et al. | |
| 2008/0294996 A1 | 11/2008 | Hunt et al. | |
| 2008/0300962 A1 * | 12/2008 | Cawston et al. | 705/10 |
| 2011/0173111 A1 | 7/2011 | Cotton | |
| 2011/0173112 A1 | 7/2011 | Cotton | |

* cited by examiner

100

Customer Database Selection 106

Previous Vehicle and Vehicle Financial Transaction Parameters 108

Financed Vehicle Sale/Lease Status 110
- New 112
- Pre-Owned 114
- Other 116
- ALL 118

Vehicle Contract Type 120
- Retail/Purchase 122
- Lease/Rent 124
- ALL 126

Current Vehicle Type Parameters 128
- Manufacturer: 130
- Model: 132
- Year: 134
- Model #: 136
- Other Attributes: 138

Email: 140

Current Vehicle Transaction Parameters 142
- Sale Person: 144
- Fin Mgr: 146
- Transaction Year: 152
- Customer Name: 148
- Zip Code: 150

SEARCH 176
CLEAR 178

Current Vehicle Financial Obligation Parameters 154
- Min. Interest Rate 156
- Min. Monthly Payment 160
- Last Payment Year: 172
- Term (Mo.) From: 164
- Min. MF: 168
- Max. Interest Rate 158
- Max. Monthly Payment 162
- Term (Mo.) To: 166
- Max. MF: 170

FIG. 5

| Group of Potential Customers User Interface 180 | | | | | | | | | |
|---|---|---|---|---|---|---|---|---|---|
| Customer Number Fields 182 | Customer Name Fields 184 | FED Contact Field 186 | Last Contact Date Field 188 | Email Address Field 190 | Telephone Number Fields 192 | Proposed Transaction Info Fields 194 | Proposed Vehicle Info Fields 196 | Current Transaction Info Fields 197 | Current Vehicle Info Fields 198 |
| | | | | | | | | | |
| | | | | | | | | | |
| | | | | | | | | | |
| | | | | | | | | | |
| | | | | | | | | | |
| | | | | | | | | | |
| | | | | | | | | | |

FIG. 6

Retail Report 500

- Proposal Qualification Status Indicator 502
- Customer Information 504
  - Name 506 | Telephone Nos. 510 | Customer # 514 | Other 516
  - Address 508 | Email Address 512 | Fed. Contact 518
- Previous Financial Transaction Contract Information 520
  - Vehicle Information 522 | Transaction Number 524
  - Financial Institution 526 | Sales Person 528
  - Transaction Information 530
    - Sale Price 532 | Amount Financed 534
    - Term 536 | Rate 538 | Monthly Payment 540
  - Current Vehicle Value Information 542
    - Book Value Used 544 | Book Value 546
  - Estimated Payoff 548 | Last Payment Date 550
- Vehicle Proposal Information 552
  - Vehicle Information 554 | Sale Price 556
  - Incentive 558 | Document Fee 560 | Title 562
  - License 564 | Taxes 566 | Minimum Profit 568
  - Current Monthly Payment 570 | Proposed Monthly Payment 572
  - Finance Amount 574 | LTV Instit. and Percentage 576
  - New Finance Rate 578 | New Term 580
  - Variance Amount Above Current Monthly Payment 582

FIG. 10

Equity Report 700

Customer Information 702
- Name 704
- Telephone Nos. 708
- Fed. Contact 716
- Address 706
- Email Address 710
- Customer # 712
- Other 714

Previous Financial Transaction Contract Information 720
- Vehicle Information 722
- Transaction Number 724
- Financial Institution 726
- Sales Person 728

Transaction Information 730
- Sale Price 732
- Amount Financed 734
- Term 736
- Rate 738
- Monthly Payment 740

Current Vehicle Value Information 742
- Book Value Used 744
- Book Value 746

- Estimated Payoff 748
- Last Payment Date 750

Equity Information 752
- Front Amount 754
- Total Amount 758

FIG. 12

METHODS, APPARATUS AND COMPUTER PROGRAM PRODUCTS FOR TARGETED AND CUSTOMIZED MARKETING OF VEHICLE CUSTOMERS

CLAIM OF PRIORITY UNDER 35 U.S.C. §120

The present Application for Patent is a Continuation of U.S. patent application Ser. No. 12/626,013 entitled "Methods, Apparatus and Computer Program Products for Targeted and Customized Marketing of Prospective Customers" filed Nov. 25, 2009, and assigned to the assignee hereof and hereby expressly incorporated by reference herein.

FIELD

In general, embodiments herein disclosed relate to methods, apparatus and computer program products for targeted and customized marketing of customers and, more specifically, an automated process whereby previous sales/lease customers are identified based on current product, service or property type and/or previous financial transaction parameters related to the current product, service or property and a replacement product, service or property proposal is determined and offered to one or more of the identified customers, such that the proposal is structured to take into account the value of the current product, service or property and variable parameters associated with the proposed transaction.

BACKGROUND

Traditionally, vehicle dealers, such as automobile dealerships, manufacturers and the like have been limited in their ability to effectively market their vehicles to previous customers and/or current service customers. In many instances, automobile dealerships have typically relied on the product itself as the means for trying to assure customer allegiance in the form of repeated purchases/leases from the same manufacturer and, more importantly, the same dealership. In this regard, the mindset has been that, if the customer has been pleased with his/her current vehicle in terms of value, performance and reliability, as well as pleased with the service provided by the dealership over the lifetime of the vehicle, the customer is likely to return to the same dealership for subsequent vehicle purchases/leases.

It is only when, and if, the previous customer returns to the vehicle dealership that a vehicle proposal is offered to the returning customer based on his/her current needs. This typically transpires by having the previous customer interface with a sales associate so that the sales associate can gain an appreciation of the customer's current needs, e.g., what type of vehicle the customer desires, what type of financial situation the customer is currently experiencing and any other relevant information that may need to be considered in offering and structuring a vehicle sales/lease proposal for the customer.

Targeted marketing or advertising in the vehicle sales realm, and more specifically targeted marketing/advertising aimed at returning customers, has generally been limited to mass postal/electronic mailings or the like that are propagated to a targeted segment of the population or to the specific group of previous sales/lease customers and/or current service customers. These types of marketing tactics have limited success because they are generic in content and do not address directly to the individual needs of particular customers. While such marketing/advertising campaigns may be directly addressed to previous customers and may acknowledge the fact that the customer is a previous customer, the advertisement/marketing materials do not typically differ from individual to individual and thus do not address the specific needs of the previous customer.

In today's electronically networked world, the ability to obtain, in real-time, information, and more specifically consumer information, is rapidly increasing on a continuous basis. Not only is an increasing amount of data/information being accumulated and stored at the individual or consumer level, the ability to efficiently mine this data is becoming increasingly more realistic. In terms of a vehicle dealership, the dealership has instantaneous access to previous vehicle financial transaction data, such as through dealership databases including ADP (Automatic Data Processing) dealer services databases, Reynolds & Reynolds databases and the like. In addition, the vehicle dealerships have access to their own unique, customer specific data. Additionally, vehicle dealerships can access and mine data from any other current, future known and/or future accessible data base. Such auxiliary databases may be instrumental in providing data to a vehicle dealership which it can then use to determine a vehicle proposal for a customer based on insight into the customer's needs.

Therefore, a need exists to develop methods, apparatus, computer program products and the like which provide for targeted and customized marketing to vehicle customers and more specifically, targeted and customized marketing to a dealership's and/or manufacturer's previous customers. The desired methods, apparatus, computer program products and the like should be an automated process that allows for dealerships and/or manufacturers to efficiently construct and disseminate customized vehicle proposals that address the recipient of the proposal's particular circumstances, including the financial obligations surrounding the recipient's current vehicle and the like. As a means of constructing the customized vehicle proposals, the desired methods, apparatus, computer program products and the like should have access to customer databases and any other databases that may provide insight into the customer's current vehicle, such as the current value of the vehicle, the customer's current vehicle financial transaction obligations and/or the customer's current needs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus and computer program products are defined that provide for targeted and customized marketing to prospective customers and, specifically in some embodiments, prospective customers having a previous relationship with the dealership or manufacturer implementing the targeted marketing. The embodiments of the invention herein disclosed provide for efficient identification of previous customers based on their current vehicle and/or their previous, and in some instances, ongoing financial obligation related to the current vehicle. A new or previously-owned vehicle is identified and a financial transaction proposal, such as a sales or lease offer, is generated for one or more of the identified previous customers based on customers meeting criteria associated with variable parameters of the proposed transaction. The vehicle proposal is automatically generated in report form, which can subsequently be communicated to the customer via an acceptable communication means, such as telephonic, postal mail, electronic mail, text message/Short Message Service (SMS) message or the like.

In one embodiment of the invention, a method for generating targeted and customized vehicle proposals is defined. The method includes receiving one or more first computer inputs for selecting one or more prospective customers from a customer database, receiving one or more second computer inputs for identifying a vehicle to propose to the one or more prospective customers and receiving one or more third computer inputs for defining one or more variable parameters associated with vehicle proposals. The method additionally includes determining, by computer processing, the one or more prospective customers based on the first and third computer inputs and determining, by computer processing, for each of the one or more prospective customers, a customer-specific proposal for the identified vehicle based at least in part on an estimated market value of a prospective customer's current vehicle. Also, the method includes storing the customer-specific proposals in computer memory.

In specific embodiments of the method, the customer database that is used for selecting prospective customers includes one or more of a previous vehicle transaction customer database (e.g., a previous sales and/or lease database), a vehicle service customer database (e.g., a previous and/or pending service database) or a third party customer database, such as a financial institution database or the like.

In other specific embodiments of the method the first inputs for selecting the one or more prospective customers may be associated with one or more of current vehicle contract type (e.g., sales, lease, etc,) current vehicle type parameters (e.g., make model, year, etc.), current vehicle financial obligation parameters (e.g., range of interest rates, range of monthly payments, range of term, range of money factor, etc.), current vehicle transaction parameters (e.g., transaction year, sales/finance person, zip code/geographic location of customers, etc.) or the like.

In further specific embodiments of the method, the second inputs for identifying the vehicle to propose to the prospective customers may be associated with vehicle type parameters (e.g., make, model, year, other attributes, etc.) or the vehicle may be identified from a listing of currently inventoried vehicles.

In still further specific embodiments of the method the third inputs for defining variable parameters associated with vehicle proposals may include, but are not limited to, an acceptable variance amount associated with a current monthly vehicle payment amount, a minimum equity amount in the current vehicle, a minimum targeted sales/lease profit amount for the identified vehicle, sale/lease price, interest rate, payment term, incentive and the like.

Other specific embodiments of the method include communicating the customer-specific proposals to each of the one or more prospective customers. The communication of the customer-specific proposals may, in some embodiments, occur electronically, such as via e-mail, text message or the like. In still further embodiments, the communication of the customer-specific communications may occur automatically based on a predetermined schedule. In other embodiments, communicating the customer-specific proposal may further generate an automated proposal letter and mailing the proposal letter to the associated prospective client or electronically communicating the customer-specific proposal to a sales associate.

In still further embodiments the method may include generating a report associated with the determined customer-specific proposals, such as an internal report that is disseminated to sales associates or the like. In one embodiment, the report is generated automatically and electronically communicated to a predetermined group of sales associates. In yet another embodiment the method may include generating a map that is configured to associate each of the one or more prospective customers with a geographic location on the map.

A computer program product that includes a computer-readable medium provides for further embodiment of the invention. The medium includes a first set of codes for causing a computer to receive one or more first inputs for selecting one or more prospective customers from a customer database, a second set of codes for causing a computer to receive one or more second inputs for identifying a vehicle to propose to the one or more prospective customers and a third set of codes for causing a computer to receive one or more third inputs for defining one or more variable parameters associated with vehicle proposals. The medium additionally includes a fourth set of codes for causing a computer to determine the one or more prospective customers based on the first and third computer inputs and a fifth set of codes for causing a computer to determine, for each of the one or more prospective customers, a customer-specific proposal for the identified vehicle based at least in part on an estimated market value of a prospective customer's current vehicle. The medium also includes a sixth set of codes for causing a computer to store the customer-specific proposals in memory.

A system for targeted and customized vehicle proposals defines yet another embodiment of the invention. The system includes one or more previous customer databases. Additionally, the system includes a computing device, such as a site or enterprise-wide server, in network communication with the one or more customer databases. The computing device includes at least one processor, a memory and a customer marketing module stored in the memory and executable by the at least one processor.

The customer marketing module is configured to receive, through displayable user interfaces, first inputs for selecting one or more prospective customers from one of the customer databases, receive second inputs for identifying a vehicle to propose to the one or more prospective customers and receive third inputs for defining one or more variable parameters associated with vehicle proposals.

Additionally, the customer marketing module includes prospective customer logic configured to determine one or more prospective customers based on the first and third inputs and proposal determining logic configured to determine a customer-specific proposal for the identified vehicle for each of the one or more prospective customers based at least in part on an estimated market value of a prospective customer's current vehicle.

Thus, methods, apparatus and computer program products are defined herein for targeted and customized marketing to vehicle customers and, specifically, in some embodiments, vehicle customers having a previous relationship with the dealership or manufacturer implementing the marketing campaign. The embodiments of the invention herein disclosed provide for efficient identification of previous customers based on their current vehicle and/or their previous, and in some instances, ongoing financial obligation related to the current vehicle. A new or previously-owned vehicle is identified and a financial transaction proposal, such as a sales or lease offer, is generated for one or more of the identified previous customers based on customers meeting criteria associated with variable parameters of the proposed transaction.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
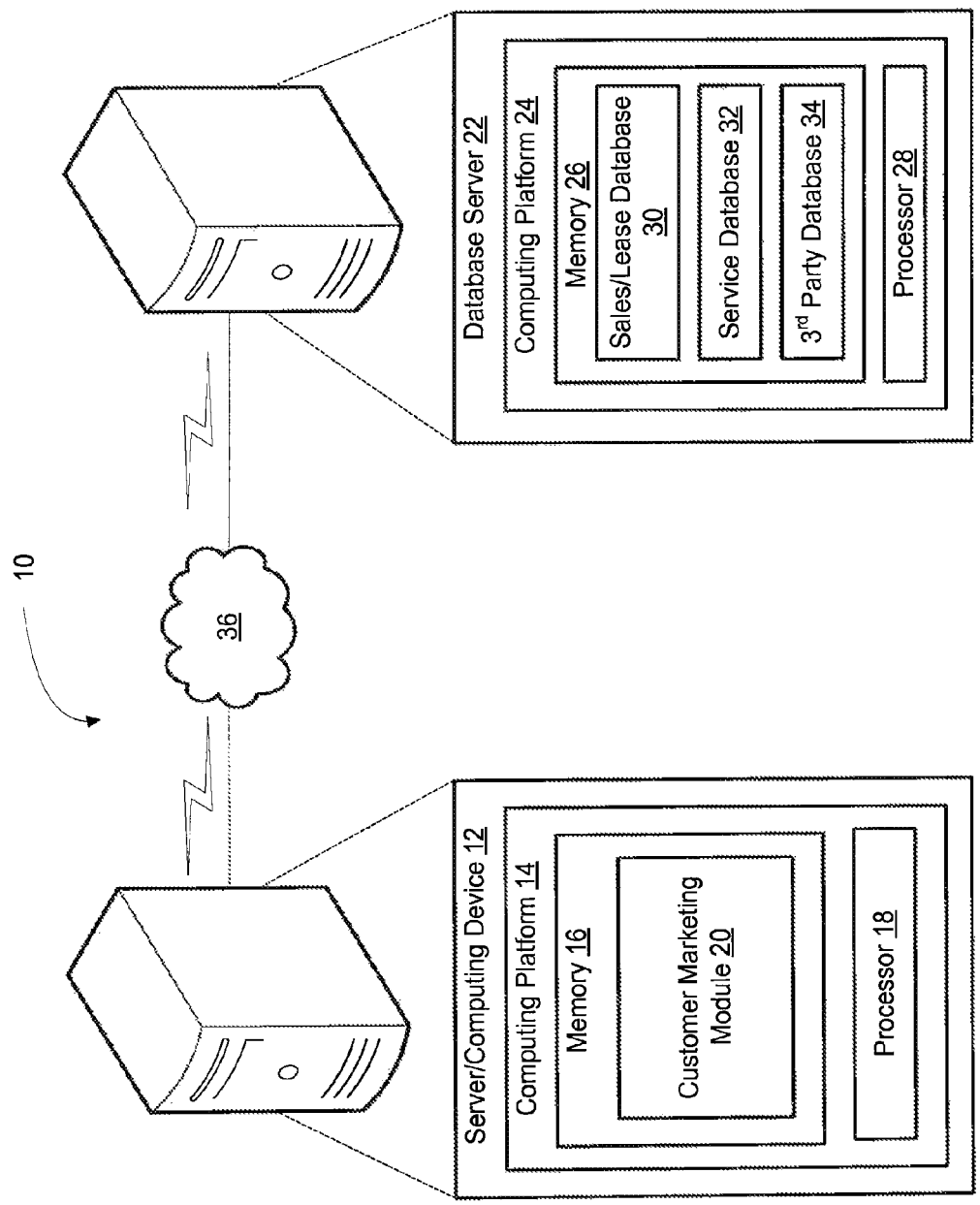
Figure 2:
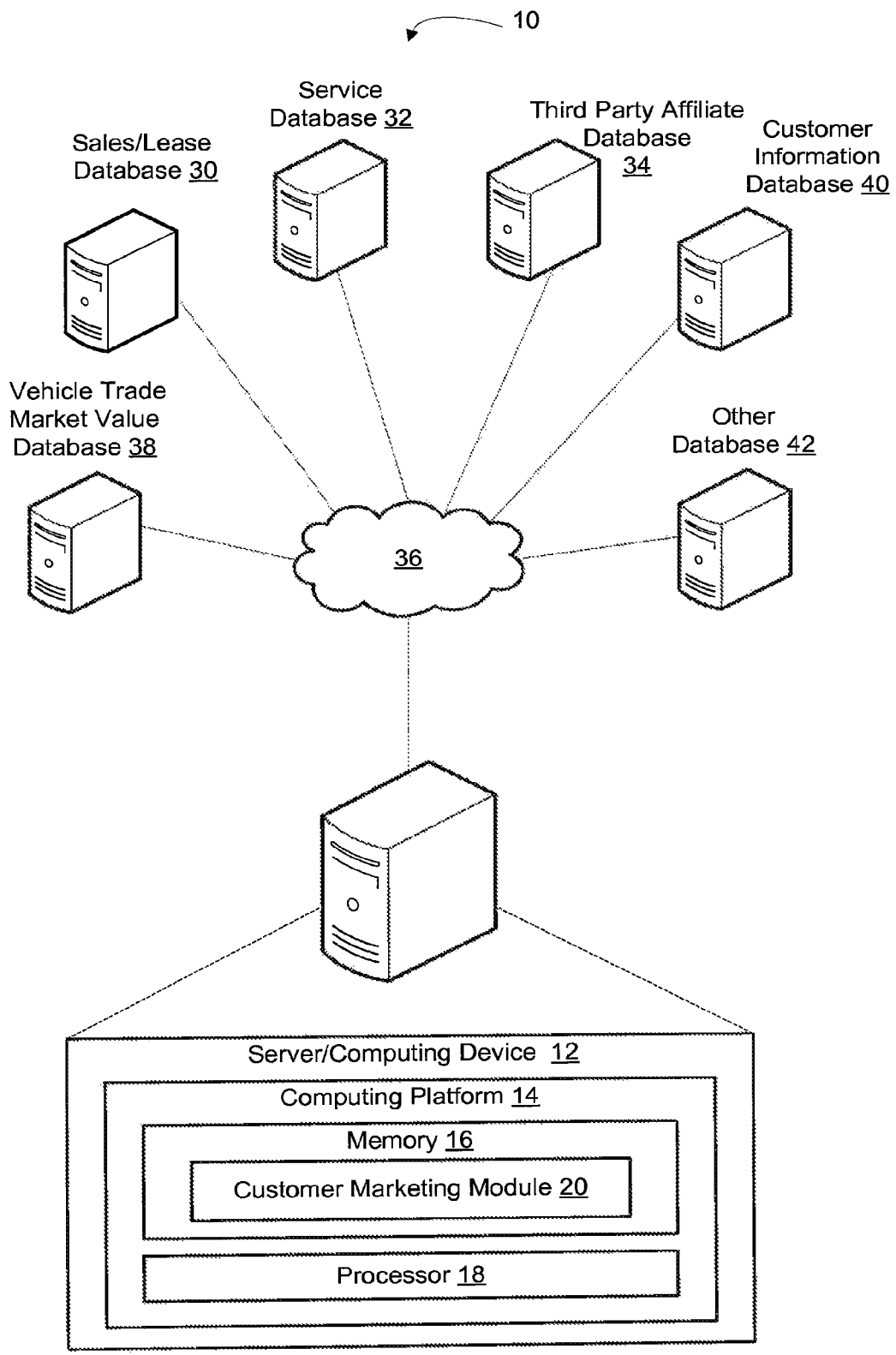
Figure 3:
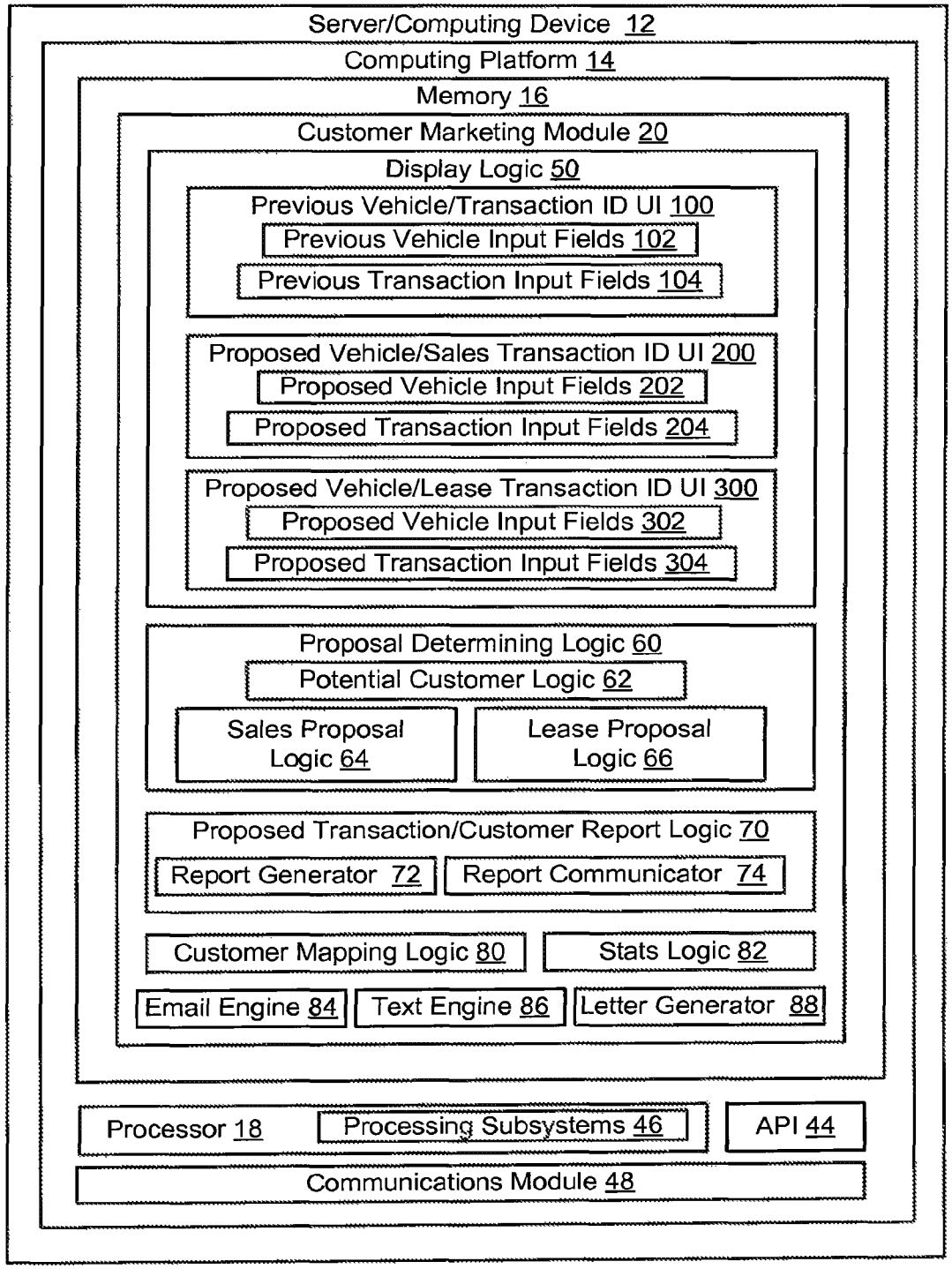
Figure 4:
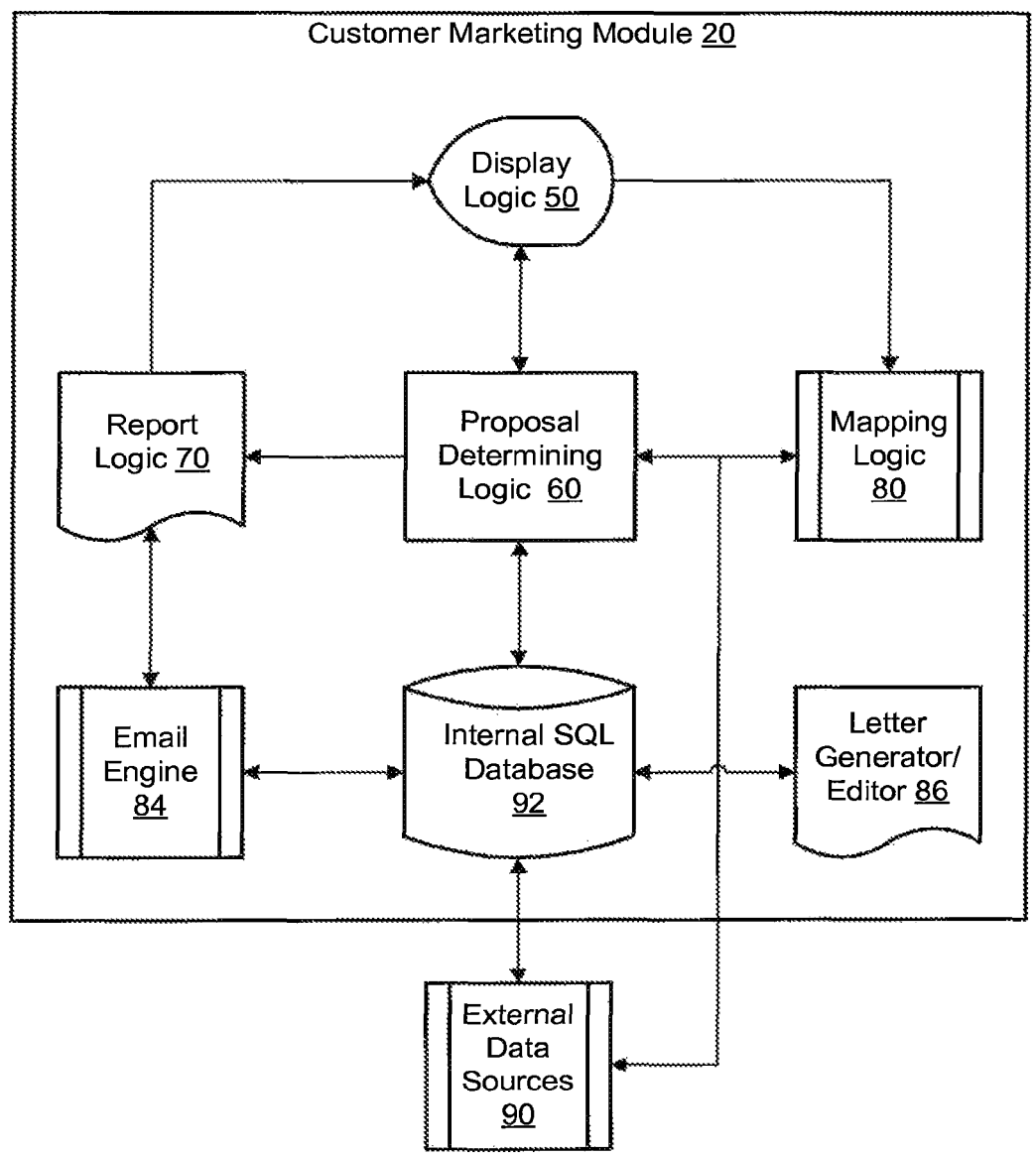
Figure 7:
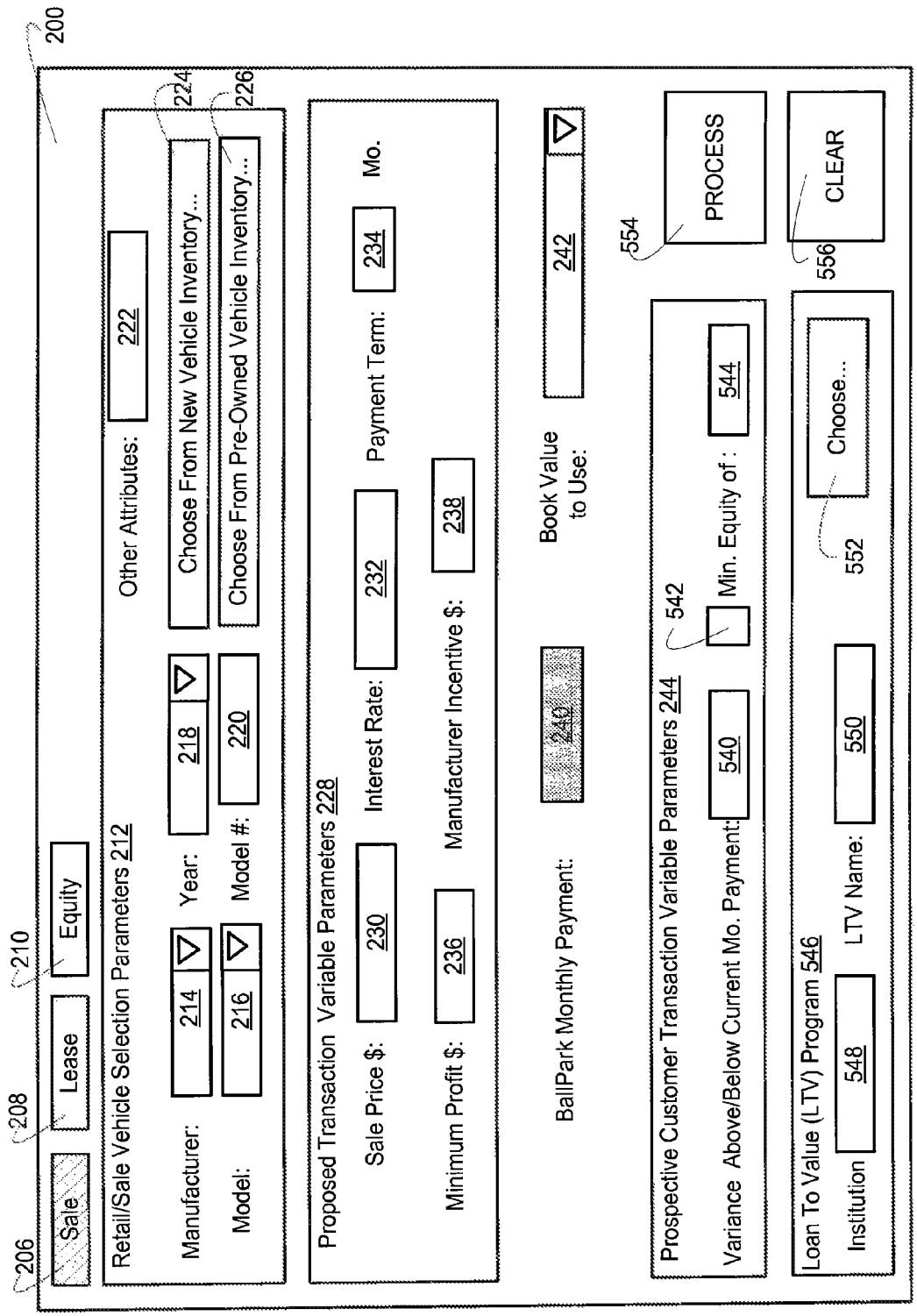
Figure 8:
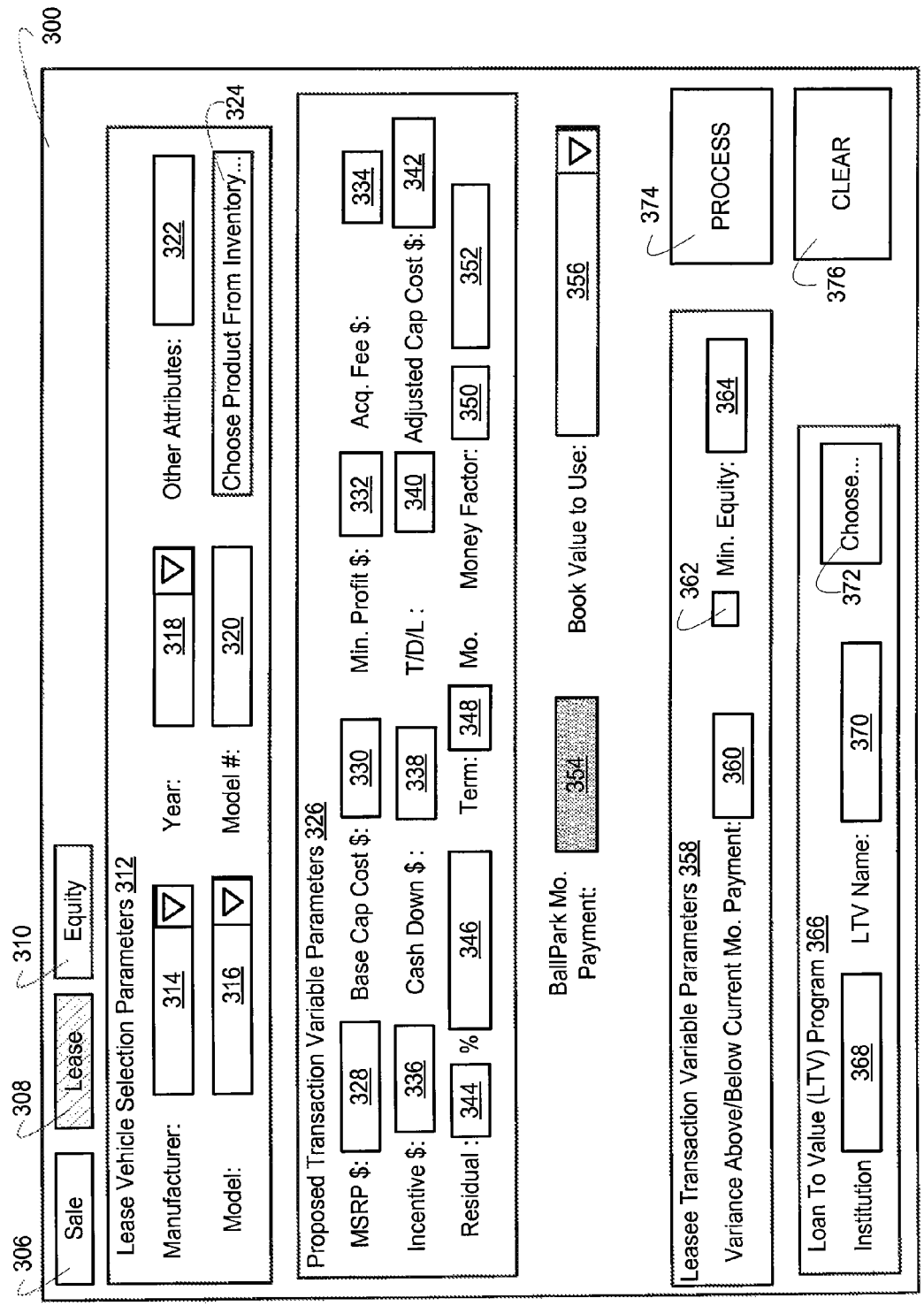
Figure 9:
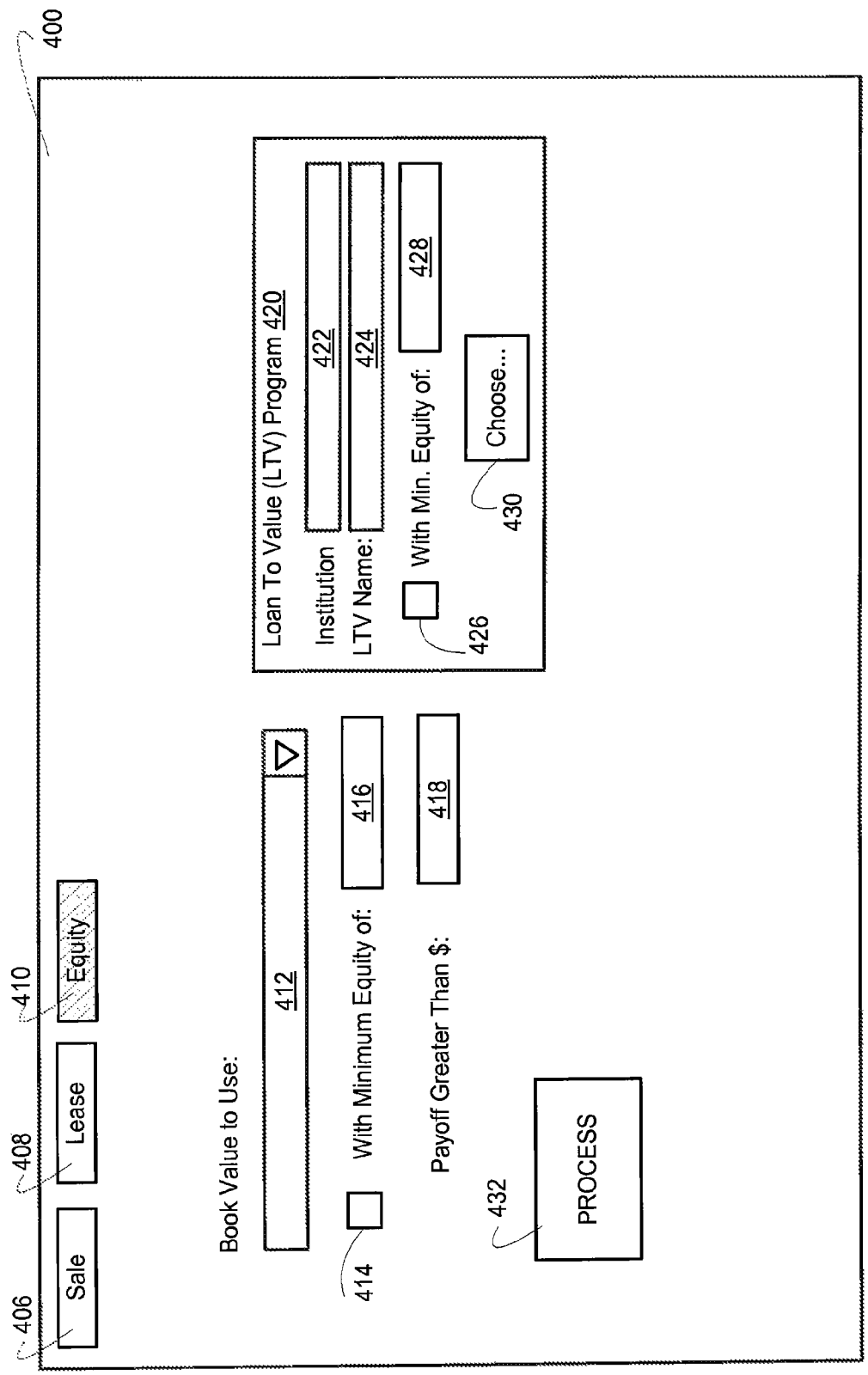
Figure 11:
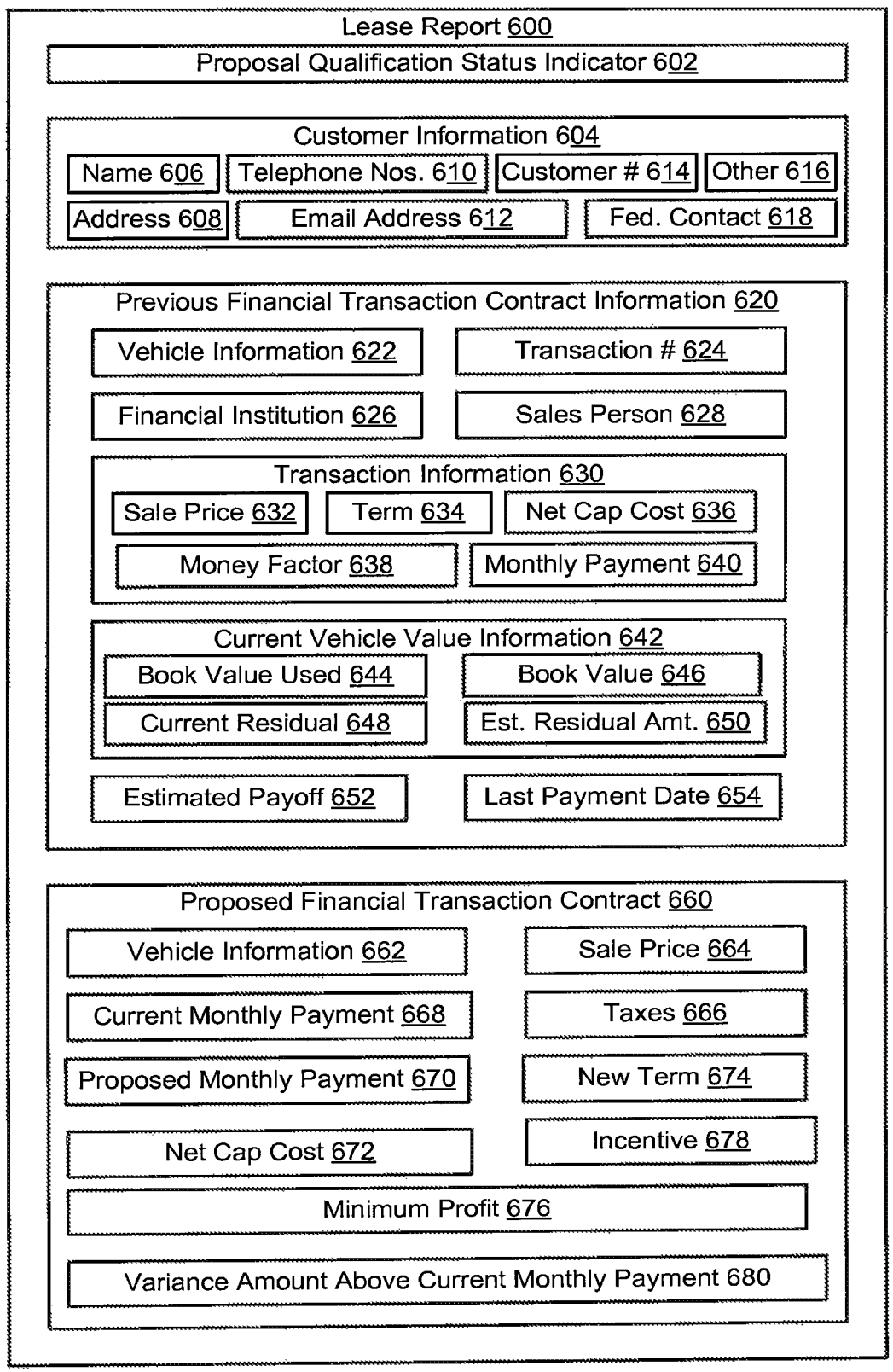
Figure 13:
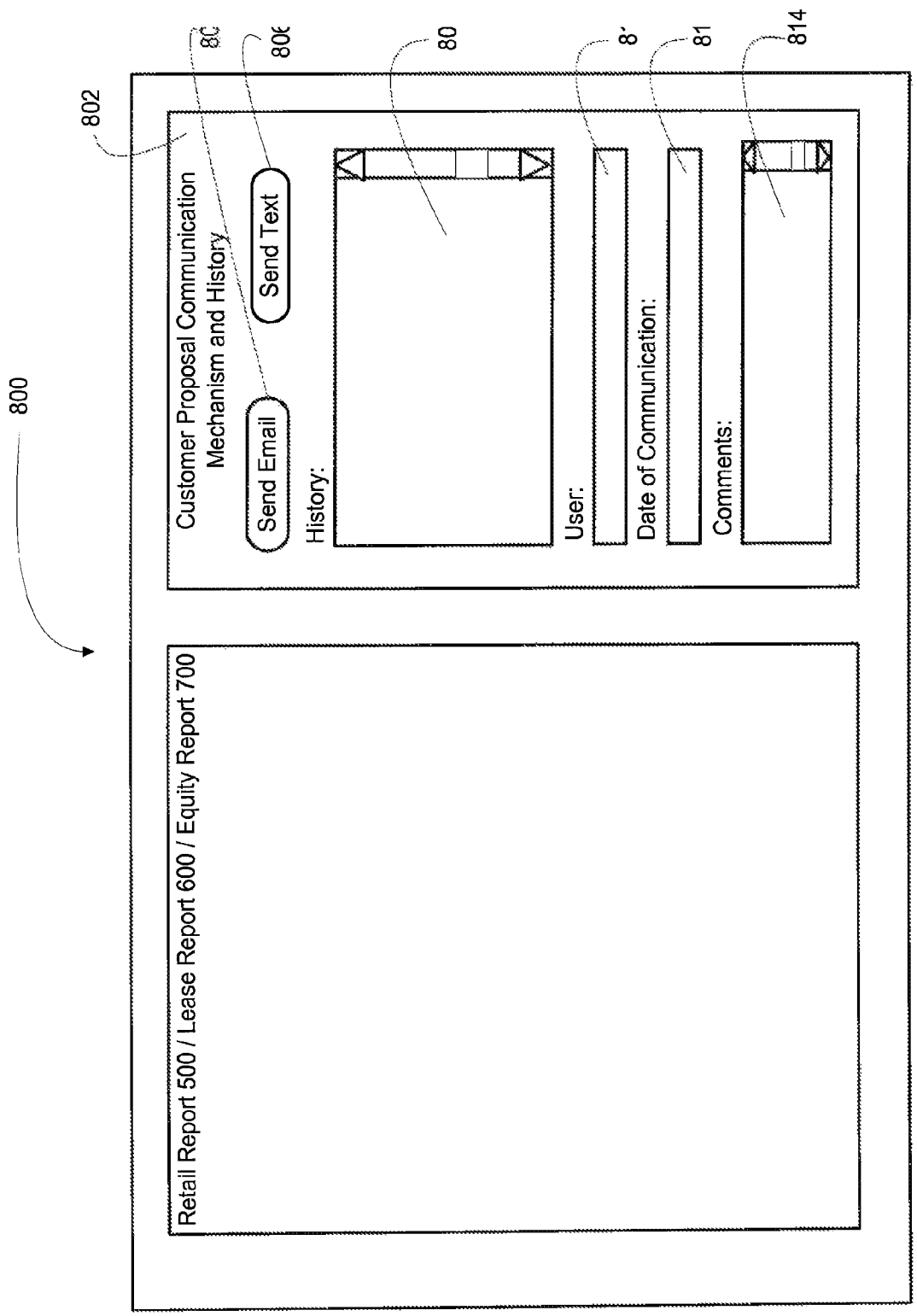
Figure 14:
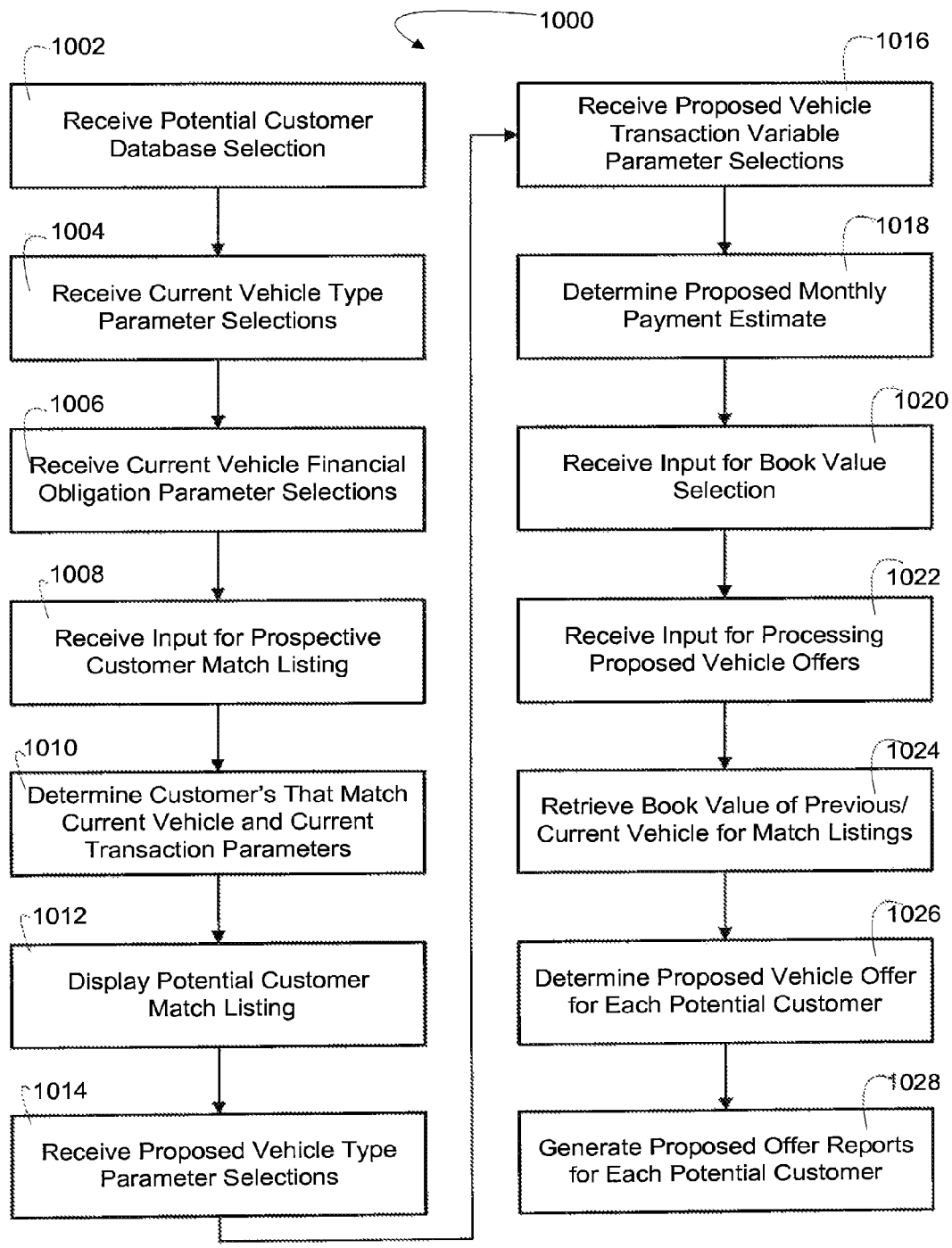
Figure 15:
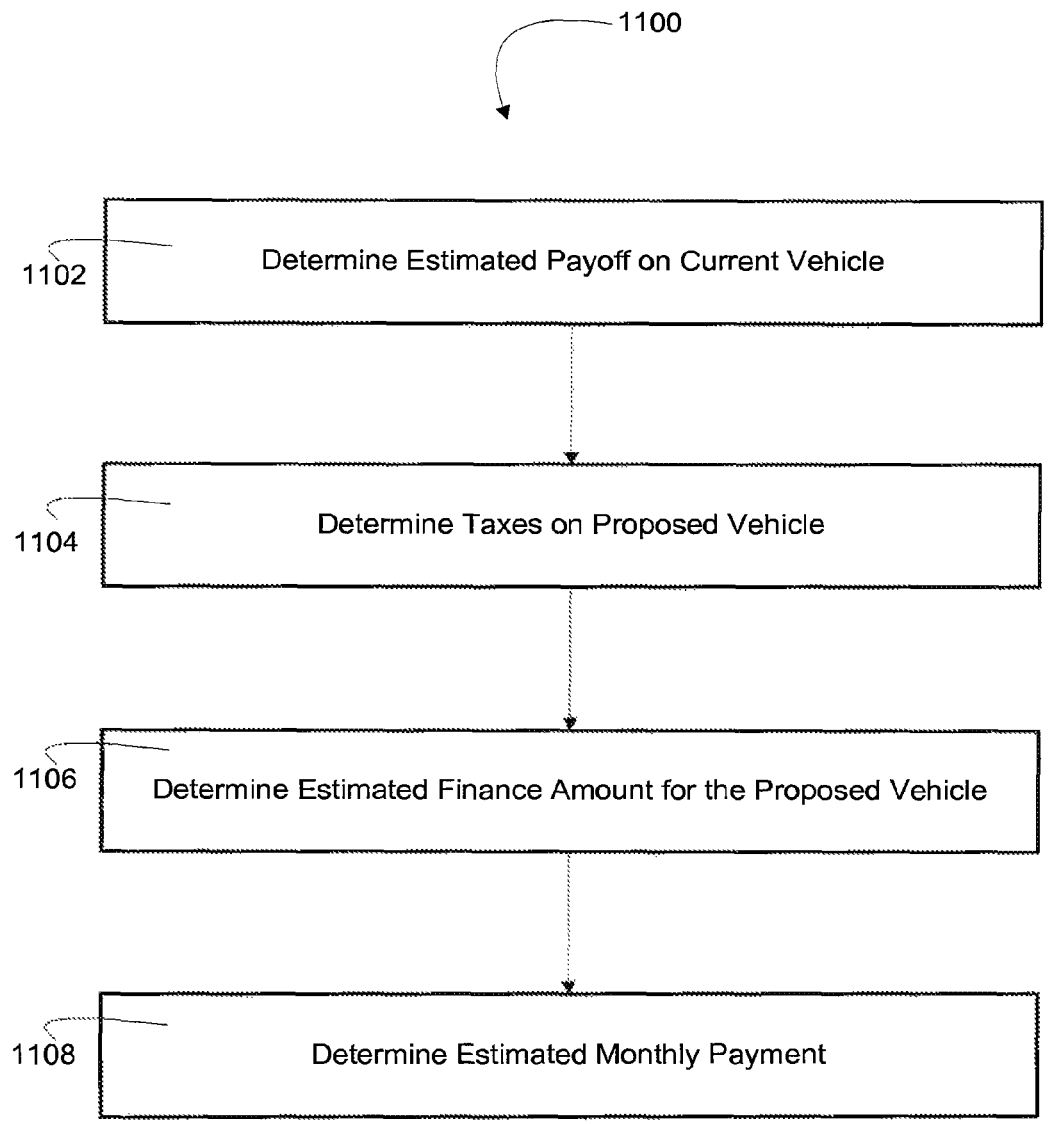
Figure 16:
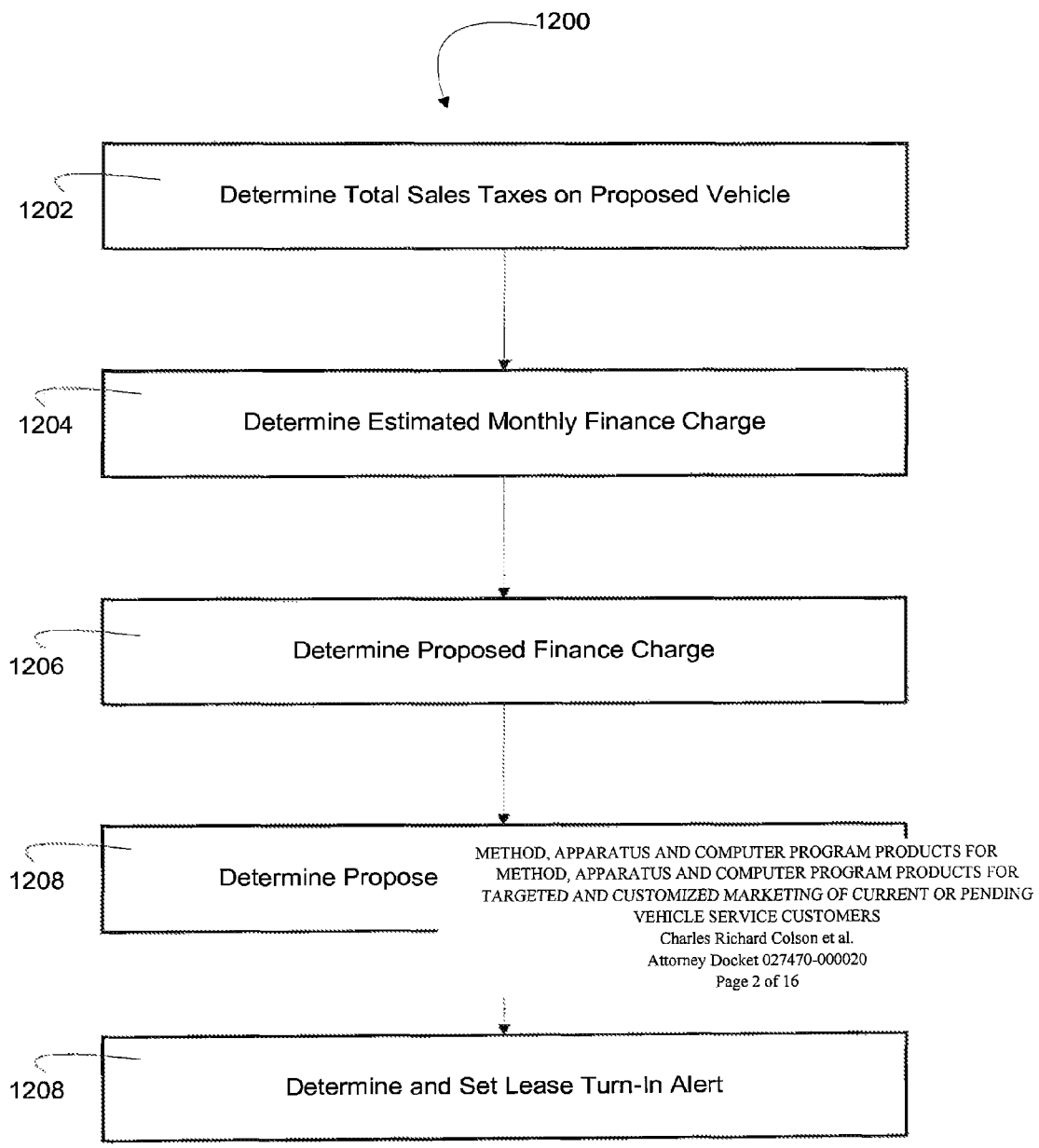

Having thus described embodiments of the invention in general terms, reference will now be made to the accompanying drawings, which are not necessarily drawn to scale, and wherein:

FIG. 1 is a schematic/block diagram depiction of a system for generating targeted and customized vehicle offers, according to an embodiment of the present invention;

FIG. 2 is a schematic diagram of a system for generating targeted and customized vehicle offers highlighting the ability to communicate and access various different networked databases, according to another embodiment of the present invention;

FIG. 3 is a block diagram of a server/computing device including a customer marketing module, in accordance with present embodiments;

FIG. 4 is a high level process flow diagram for generating targeted and customized vehicle proposals, in accordance with present embodiments;

FIG. 5 is a block diagram of an exemplary User Interface (UI) for inputting data that identifies a group of prospective customers that may be targeted for vehicle offers, in accordance with present embodiments;

FIG. 6 is a block diagram of an exemplary potential customer listing panel display, in accordance with an embodiment of the present invention;

FIG. 7 is a block diagram of an exemplary User Interface (UI) for selecting a proposed vehicle for sales offer and selecting the financial transaction parameters associated with the selected vehicle, in accordance with present embodiments;

FIG. 8 is a block diagram of an exemplary User Interface (UI) for selecting a proposed vehicle for lease offer and selecting the financial transaction parameters associated with the selected vehicle, in accordance with present embodiments;

FIG. 9 is a block of an exemplary User Interface (UI) for determining a prospective customer's vehicle equity, in accordance with present embodiments;

FIG. 10 is a block diagram of an exemplary retail/sales report that includes a proposed retail/sales offer for a designated potential customer, in accordance with another embodiment of the present invention;

FIG. 11 is a block diagram of an exemplary lease report that includes a proposed lease offer for a designated potential customer, in accordance with another embodiment of the present invention;

FIG. 12 is a block diagram of an exemplary equity report, in accordance with yet another embodiment of the invention;

FIG. 13 is a block diagram of an exemplary User Interface (UI) providing joint display of a sales/lease/equity report and prospective customer proposal communication mechanisms and history, in accordance with an embodiment;

FIG. 14 is a flow diagram of a method for generating targeted and customized vehicle offers for identified potential customers, in accordance with an embodiment of the present invention;

FIG. 15 is a flow diagram of a method for determining the specifics of a sales offer, in accordance with an embodiment of the present invention; and FIG. 16 is a flow diagram of a method for determining the specifics of a lease offer, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for targeted and customized marketing of vehicle customers and, more specifically targeted and customized re-marketing to previous vehicle customers of a dealer, manufacturer or lender. For the purposes of this invention, the term vehicles as used herein and as claimed refers to any conveyance that may require financing, such as, but not limited to, an automobile, a truck, a motorcycle, a recreational vehicle (RV), a mobile home, a boat, an airplane or the like, or further encompasses both new and previously-owned/leased vehicles.

While embodiments herein disclosed are discussed in terms of vehicles, the methods, systems, computer program products and the like may extend to other products, property and/or services, which utilize some form of financing and/or some re-occuring payment model. For example, the embodiments herein described may apply to real property, insurance policies, such as life insurance policies or the like. As such, the invention may provide for targeted and customized marketing and, moreover, re-marketing of real estate buyers/leasors and/or life insurance policy holders/owners.

The methods, systems and computer program products herein disclosed are operative to provide prospective customers with a vehicle proposal that is consistent with or better than their pre-existing financial obligation, in terms of monthly payments, equity or the like. Embodiments of the present invention, devise one or more vehicle proposals for a prospective customer based on assessing the current financial obligations associated with his/her current vehicle and choosing an appropriate vehicle to offer the prospective customer based on an estimate of a variance amount above or below their current monthly payment obligations. In this regard, if the dealer believes that a prospective customer is within a $50.00 range for increase in their monthly payment (i.e., the prospective customer would find acceptable a $50.00 or less increase in their monthly payment), a vehicle proposal is determined that offers the prospective customer a new or previously owned vehicle and, in some instances an upgraded make/model, at only a slighter higher (i.e., $50.00 or less) monthly payment than they are currently undertaking Moreover, in today's volatile financial climate, the present invention allows for devising proposals that may decrease the prospective customer's financial obligations by decreasing their monthly payment but at the same time placing the prospective customer in a new, and in some instances, an upgraded make/model. Such a proposal may be devised by choosing a less expensive make/model than the prospective customers current vehicle, providing better finance rates than the current financial obligation, extending the finance term on the proposal or lowering the profit or incentives provided to the dealer in the proposal, or a combination of the forgoing.

Referring to FIG. 1, a high-level schematic/block diagram is depicted of system for targeted and customized marketing of vehicle customers. The system 10 comprises a server/computing device 12, which may be a dedicated server computer or a desktop/laptop computer implementing a server application, such as SQL (Structured Query Language) server express 2005 or greater, available from the Microsoft Corporation of Redmond, Wash. As such, server/computing device 12 includes a computer platform 14 that includes memory 16 and a processor 18 in communication with memory 16. The memory 16 stores, and the processor 18 is configured to operate, customer marketing module 20.

Customer marketing module 20 is operable to identify one or more targeted customers based on their current vehicle type, current vehicle mileage, current vehicle age, ongoing financial obligations associated with the current vehicle and/or variable parameters associated with a vehicle transaction proposal. In addition to identifying one or more targeted customers, the invention provides for the user to identify a proposed vehicle for the one or more targeted customers by either choosing a proposed vehicle from a listing of available vehicles or defining vehicle parameters for a proposed vehicle.

Once a proposed vehicle is identified, variable parameters associated with a proposed vehicle offer are set. For a sales proposal, these variable parameters may include, but are not limited to, vehicle parameters, such as, a sales price, a finance rate, a finance term, a minimum dealer profit and a dealer incentive; and prospective customer parameters, such as variance of the monthly payment above the current payment and minimum equity in the current vehicle. For a lease proposal, these variable parameters may include, but are not limited to, vehicle parameters such as, a minimum lease profit, a dealer incentive, a cap cost reduction, a residual percentage and a money factor; and prospective customer parameters such as variance of the monthly payment above the current payment.

Once the prospective customers are identified, a vehicle is identified and proposal variable parameters are set, a proposal is determined. Determination of the proposal includes determining an estimated market value of the customer's current vehicle. Additionally, determination of a sales proposal may include, but is not limited to, determining an estimated current vehicle payoff amount, determining estimated sales tax, determining an estimated net cap cost for the proposed vehicle and determining an estimated monthly payment for the proposed vehicle. For a lease proposal, determination may include, but is not limited to, determining an estimated monthly finance charge, determining a proposed finance charge, determining estimated total taxes, determining an estimated monthly depreciation charge and determining and setting a lease turn-in alert.

Once the proposals for each prospective customer are determined, the module 20 may generate an internal report for the dealer that includes customer information, current customer vehicle information and the proposal for each prospective customer. The internal report may be automatically disseminated to a designated email distribution list. In addition, the module may also generate and initiate the communication of customer email, texts, voice mail or the like that provides the proposal to the customer and/or a letter generating routine that provides for a postal letter template that includes the proposal.

In addition to server/computing device 12, system 10 includes database server 22. While a single server is shown in FIG. 1, in practice the database server 22 may comprise more than one server. Server 22 includes a computing platform 24 having a memory 26 and a processor 28 in communication with the memory. The memory 26 stores, and the processor is configured to access, sales/lease database 30 and/or service database 32 and/or third-party database 34, such as a financial institution databases or the like. Sales/lease database 30 and service database 32 may be internal, dealership-based databases or external databases. External databases may include, but are not limited to, Automatic Data Processing (ADP) dealer services database, Reynolds & Reynolds database or the like. Thus, the network 36 communication link between the server/computing device 12 that includes the customer marketing module 20 and the database server 22 may be a local network, an external network, such as the Internet or a combination of a local network and an external network. To facilitate the exchange of data between the system and the internal databases, the system may be in real-time connection with such databases to insure up-to-date data or, alternatively, the system may periodically upload data from such databases.

The sales/lease database 30 may be accessed by customer marketing module 20 to retrieve information related to previous customer sales or leases such as previous customer's current vehicle type and ongoing financial obligations associated with the current vehicle. This type of information is used to define the group of prospective customers to whom a proposal will be made.

The service database 32 may be accessed to identity one or more prospective customers based on a pending or previous service appointment. Additionally, service database 32 may be accessed by customer marketing module 110 to retrieve information related to previous service information, such as vehicle type, service history and the like. This type of information may also be used to define the group of prospective customers that the proposal will be offered to. Additionally, service database 32 may be accessed by customer marketing module 20 to retrieve information associated with the present condition of the customer's current vehicle, which may be used during the proposal determination process to determine an estimated market value of the current vehicle. For example, the service database 32 may indicate a most recent mileage reading for the current vehicle.

The third-party database 34, such as financial institution database or the like may be accessed by customer marketing module 20 to retrieve information related to previous or ongoing financial transactions, such as ongoing loans or the like financed through the financial institution. In addition to identifying prospective customers based on the previous/ongoing financial transactions, the third-party database can provide other information, such as FICO scores, loan payoff information, past due or late payment information and the like.

Referring to FIG. 2, a schematic/block diagram is provided that illustrates various databases which may be included in system 10, according to present embodiments of the invention. In addition to sales/lease database 30, service database 32, and third-party database 34, the customer marketing module 20 may be in communication with and access other databases, such as vehicle trade-in market value database 38, customer information database 40 or any other database 42 that provides for public or private access. Customer marketing module 20 may access vehicle trade-in market value database 38 to determine the current trade-in value for the prospective customer's current vehicle. Examples of vehicle trade-in market value databases 38 include, but are not limited to, BlackBook®, CarFax® or the like. As previously noted, the customer marketing module 20 may access a service database 32 to retrieve information that is obtained as part of the dealer servicing the customer's existing vehicle that reflects the present condition of the current vehicle, such as a current mileage reading, which may be used during the proposal determination process to determine an estimated market value of the customer's or group of customers current vehicle. In addition, the customer marketing module 20 may provide for the dealer/user to define a book-value-to-use parameter, such as wholesale average or the like.

The customer information database 40 may include any database that provides contact type information for the customer, such as current address, current phone numbers, current email addresses and the like. The customer marketing module 20 may access customer information database 40 to verify that customer information found in an internal sales/lease database is up-to-date and accurate and provide updated contact information where needed. An example of a customer information database 38 includes, but is not limited to, Whitepages.com™ or the like.

Other databases 42 currently accessible or accessible in the future may also be accessed and implemented in conjunction with the customer marketing module 20. The other databases 42 may include any database that includes further customer information or customer demographic information that may be used by the customer marketing module 20 to determine the group of prospective customers to be targeted. For example, other database 42 may include a credit reporting database that may be accessed to estimate the current financial status of prospective customers. Examples of credit reporting databases include Equifax®, Experian®, TransUnion® and the like. Additionally, other databases 42 may include a lender database, a census database, a tax database or any other government registration database, such as a state or county vehicle registration database. Such databases may be accessed to determine prospective customers that are new to the geographic area or the like. Additionally, other databases 42 may include a map database, such as Google® map, Microsoft® MapPoint® or the like, that are accessible by the customer marketing module 20 to generate maps that indicate the address/physical location of prospective customers identified in the proposal process. Also, any other database that may provide insight into the customer's current financial status may also be beneficial to determining the group of targeted prospective customers. For example, a government database that indicates a claim for employment benefits may be beneficial to selecting a target prospective customer group that may be interested in vehicle proposals that would take them out from under an existing financial obligation and place them in a vehicle with a new financial obligation less than their current obligation, e.g., lower monthly payments.

Turning the reader's attention to FIG. 3, a block diagram is depicted of a server/computing device 12 that includes the customer marketing module 20, according to the present embodiment of the invention. In addition to providing greater detail, FIG. 3 highlights various optional embodiments. The server/computing device 12 may include any type and/or combination of one or more computing devices, such as a personal computer, a laptop/portable computer, a wireless or handheld computing device, a personal digital assistant (PDA), a server or the like. The computer platform 14 is operable to receive and execute modules, routines and applications, such as customer marketing module 20 and the like. Computer platform 14 includes memory 16, which may comprise volatile and nonvolatile memory such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computer platform 14 also includes processor 18, which may be an application-specific integrated circuit ("ASIC"), or other chipset, processor, logic circuit, or other data processing device. Processor 18 or other processor such as ASIC may execute an application programming interface ("API") layer 44 that interfaces with any resident programs, such as customer marketing module 20 or the like, stored in the memory 16 of server/computing device 12.

Processor 18 includes various processing subsystems 46 embodied in hardware, firmware, software, and combinations thereof, that enable the functionality of server/computing device 12 and the operability of the device on a network. For example, processing subsystems 46 allow for initiating and maintaining communications and exchanging data with other networked devices.

Additionally, computing platform 14 includes a communication module 48 embodied in hardware, firmware, software, and combinations thereof, that enables communications among the various components of the server/computing device 12, as well as between the network 36. In described aspects, the communication module 48 enables the wired and/or wireless communication of all correspondence between server/computing device 12 and other wired or wireless devices. Thus, communication module 12 may include the requisite hardware, firmware, software and/or combinations thereof for establishing a wireless network communication connection.

The memory 16 of server/computing device 12 stores customer marketing module 20. Customer marketing module 20 includes display logic 50 that is operable for displaying User Interfaces (UIs), such as previous vehicle/transaction identifying UI 100 (shown and described in FIG. 5), proposed vehicle/sales transaction identifying UI 300 (shown and described in FIG. 7) and proposed vehicle/lease transaction identifying UI 600 (shown and described in FIG. 8).

UI 100 may include a plurality of previous vehicle parameter input fields 102, which define the type of vehicle that prospective customers currently own/finance, such as input fields for make, model, year and the like. UI 100 may also include a plurality of previous vehicle transaction input fields 104, which define attributes/parameters associated with the financial obligation (i.e., loan or lease) pertaining to the current vehicle. Inputs into input fields 102 and 104 are implemented as search criteria for identifying prospective customers from an internal or external customer database.

UI 200 may include a plurality of proposed vehicle parameter input fields 202, which define the type of vehicle that is being proposed for a sale proposal to the prospective customer, such as input fields for make, model, year and the like. Or the UI may allow for the user/dealer to select the vehicle from a list of available vehicles. UI 200 may also include a plurality of proposed vehicle transaction input fields 204, which define attributes/parameters associated with the proposed financial loan pertaining to the proposed vehicle. Inputs into input fields 202 and 204 are subsequently used in determining the specifics of the sales proposal that are presented to the prospective customers.

UI 300 may include a plurality of proposed vehicle parameter input fields 302, which define the type of vehicle that is being proposed for a lease proposal to the prospective customer, such as input fields for make, model, year and the like. Or the UI may allow for the user/dealer to select the vehicle from a list of available vehicles. UI 300 may also include a plurality of proposed vehicle transaction input fields 304, which define attributes/parameters associated with the proposed financial lease pertaining to the proposed vehicle. Inputs into input fields 302 and 304 are subsequently used in determining the specifics of the lease proposal that is presented to the prospective customer.

Customer marketing module 20 also includes proposal determining logic 60 that is operable to determine sales or lease proposals for the proposed vehicles based on the inputs received at UIs 100, 200, 300. In this regard, proposal determining logic 60 may include prospective customer logic 62 operable for determining a group of prospective customers from an internal or external database of customers based on inputs at UI 100. Proposal determination logic 60 may additionally include sales proposal logic 64 operable for determining specific attributes of a sales proposal based on inputs at UI 200. Additionally, proposal determination logic 60 may additionally include lease proposal logic 66 operable for determining specific attributes of a lease proposal based on inputs at UI 300.

Customer marketing module 20 may also include proposed transaction reporting logic 70 operable to generate and communicate a proposed sales or proposed lease report that details the targeted and customized sales or lease proposal. In this regard, proposed transaction reporting logic 70 may include proposed sales/lease report generator 72 operable to generate the sales and/or lease reports and proposed sales/lease report communicator 74 operable to communicate the reports electronically to a plurality of designated recipients, such as sales associates.

The customer marketing module 20 may also include mapping demographic logic 80 operable to connect with external map databases, such as Google® Maps or the like to retrieve maps and produce maps with customer demographics data, such as location of customers and the like.

In further embodiments, the customer marketing module 20 may also include statistics logic 82 operable to determine statistical data related to previous sales/leases and/or currently proposed sales/leases and/or service-related data. The statistics logic 82 may generate statistics that are displayable through display logic 50 and/or communicable via email engine 84, text engine 86 or the like. Statistical data related to previous sales/leases may include, but is not limited to, sales/leases per month of a vehicle type, sales per loan maturity year, leases per lease maturity year, sales/leases per geographical area, and the like. Statistical data related to service-related data may include, but is not limited to, quantity serviced per vehicle type, quantity of proposed sales/lease proposals per serviced vehicle type, quantity of pending service appointments per date, quantity of proposed sales/lease proposals per date, quantity of vehicles with no service history, quantity and vehicle type of vehicles serviced with no sales history and the like.

Additionally, the customer marketing module 20 may also include an email engine 84 and/or text engine 86 that is operable for generating internal email/texts and external email/texts associated with the customer marketing module 20. Examples of internal email/texts may include email/texts that include the sales or lease reports and email/texts that include sales related task lists associated with the sales or lease reports, such as contact responsibilities and the like. Examples of external emails/texts may include customer emails/texts that include the targeted and customized sales or lease proposal and third-party affiliate emails/texts, such as a financial institution/lender, that notifies the third-party of the identified targeted and customized sales or lease proposal. In the third-party affiliate scenario, the information provided to the third-party affiliate may be used to provide the proposals to the customers via third-party affiliate advertising, such as bank/loan statement advertising or the like. Customer marketing module 20 may additionally include letter generator/editor 88 that is operable to create and edit customer letters which are to be communicated to a prospective client according to predetermined guidelines.

FIG. 4 depicts a high level process flow between the various components of the customer marketing module 20 and external data sources 90; in accordance with an embodiment of the present invention. Display logic 50 is operable to display UIs that receive user inputs for identifying prospective customers based on current vehicle type and/or current financial obligations associated with the current vehicle and identifying a proposed vehicle for sale or lease and the parameters associated with a financial transaction (i.e., lease or loan) pertaining to the proposed vehicle. Display logic 50 is in communication with proposal determining logic 60, which receives the user inputs and determines prospective customers and the specifics of the sales and or lease proposals offered to the prospective customers.

Display logic 50 is also in communication with report logic 70 and mapping demographic logic 80. Report logic 70 is operable to receive proposals from proposal determination logic 60 and generate sales and/or lease reports based on the determined proposals. The reports may be displayed via display logic 50 or the reports may be communicated electronically via email engine 84 to sales associates or the like. Mapping demographics logic 80 is operable to create maps that include prospective customer demographic data, such as the location of the customer and contact information. Mapping logic 80 relies on generic map templates for creating the maps and, as such, is in communication with external data sources 90, such as Google® maps or the like for accessing and retrieving map templates. The maps generated by mapping demographics logic 80 are operable to be displayed via display logic 50.

Proposal determining logic 60 is in communication with internal Structured Query Language (SQL) database 92 that is operable to sort and manipulate data for communication between all of the logic entities of the customer marketing module 20 and the external data sources 90. The customer marketing module 20 also includes letter generator/editor 86 in communication with the internal SQL database and operable to generate customer letters based on letter templates and proposed sales or lease proposals communicated from the proposal determination logic.

Referring to FIG. 5, an example of a previous vehicle/transaction identifier (i.e., prospective customer identifier) user interface (UI) 100 included in the customer marketing module 20, according to a present embodiment of the invention. The prospective customer identifier UI is displayed to the user/dealer and is operable to receive user/dealer inputs that define parameters for identifying one or more prospective customers. The fields shown in FIG. 5 are by way of example only and, thus other fields may be added to or deleted from the UI 100 without departing from the inventive concepts herein disclosed. UI 100 includes a customer database selection field 106 that is operable to receive inputs that select or choose the database that is to be searched to identify the one or more prospective customers.

The databases that may be chosen from customer database selection field 106 may be an internal or external sales/lease database 30 that includes previous sales/lease customer information and details related to the previous customer transaction including, but not limited to, previous and/or ongoing financial obligation (i.e., loan or lease) associated with the previous vehicle sale/lease. Additionally, the databases may include internal or external service databases 32 that include listings of customer's having previous and/or pending service appointments, the vehicles associated with those scheduled appointments or the like. Also, the databases may be third-party databases 34, such as financial institution databases or the like that include listings of customer's having ongoing vehicle financing/loans established with the financial institution or the like.

In the illustrated embodiment of FIG. 5, the customer database selection field 106 provides for a drop-down window that may display a plurality of database choices. For example, the database choices may include different dealerships or business units within a company. Thus, the customer database selection field 106 may be configured in those instances in which the user/dealer has access to multiple different customer databases.

It should be noted that, in other instances in which the customer marketing module 20 does not rely on a database to identify a group of prospective customers, UI 20 may be used to define the previous transaction financial terms for a prospective customer. In this instance the prospective customer may not be a previous sales or service customer, but instead, may be any prospective customer. For example, if a customer that has had no prior relationship with the dealership contacts the dealership and makes it aware of the financial terms of the customer's previous transactions, a sales associate or the like may enter that information manually into UI 100 and proceed to UI 200 (FIG. 7) for identification of a vehicle best suited for offering to the prospective customer and the identification of the financial terms of a proposal associated with the identified vehicle. In turn, the customer marketing module 20 may determine a proposal that will be extended to that particular customer and that particular customer only.

The UI 100 includes previous vehicle and vehicle financial transaction parameters 108 that are selected by the user/dealer and serve as the match or search criteria for determining the group of prospective customers. Parameters 108 may include, but are not limited to, vehicle product sale/lease status field 110 which provides for the user/dealer to select between previous sale/lease transactions for new vehicles 112, pre-owned vehicles 114, other designated vehicles 116 or all of the vehicles 118. Additionally, parameters 108 include a vehicle transaction contract type field 120 which provides for the user/dealer to select between previous contract types, such as retail/sales contracts 122, lease contracts 124 and all contracts 126.

Parameters 108 also include current vehicle type parameters 128 that include, but are not limited to, manufacturer field 130, model field 132, year field 134, model number field 136 and other attribute field 138 such as body style or the like. Similar to the customer database selection field 106, the vehicle parameter fields may provide for a drop-down window for selecting a parameter from a drop-down list or the field may require data entry, such as the model number field 136. The drop-down lists may be presented based on a subsequent selection, for example, selection of a vehicle manufacturer may dictate which model drop-down list appears and the selection of the model may dictate which year drop-down lists appears.

Additionally, parameters 108 may include an email address field 140 which provides for the user/dealer to select whether the group of prospective customers includes an email address in the database. As discussed in detail infra., an email address is beneficial for those embodiments of the invention in which the customer marketing module 20 includes a routine for automatically generating and initiating the communication of emails that include the vehicle proposal. The email address field 140 may include a drop-down window that allows the user/dealer to choose between those customers having an email address, those customers not having an email address and all customers.

Previous vehicle and vehicle transaction parameters 108 also include current vehicle transaction parameters 142. The previous transaction parameters include a salesperson field 144 for identifying the salesperson associated with the previous sales/lease transaction, a finance manager field 146 for identifying the finance manager associated with the previous sales/lease transaction, a customer name field 148 for limiting the prospective customers to one specific previous customer, a zip code field 150 for identifying a specific zip code for previous sales/leases and a transaction year field 152 for identifying the year in which the previous transaction transpired.

Additionally, previous vehicle and vehicle financial transaction parameters 108 include current vehicle financial obligation parameters 154. The financial obligation parameters 154 include the minimum and maximum finance/interest rate fields 156 and 158 that allow the user/dealer to identify a maximum and/or minimum finance/interest rate for the previous vehicle transactions; the minimum and maximum monthly payment fields 160 and 162 that allow the user/dealer to identify maximum, maximum and/or range of monthly payment amounts for previously financed transactions; the minimum and maximum finance term fields 164 and 166 that allow the user/dealer to identify the minimum and/or maximum range of finance terms; and the minimum and maximum money factor fields 168 and 170 that allow the user/dealer to identify the minimum and/or maximum lease contract money factor. Financial obligation parameters 154 may also include a last payment year field 172 that allows the user/dealer to identify a year for which the last payment is due in outstanding finance obligations.

The previous vehicle/transaction identifier/prospective customer identifier UI 100 also includes a search key 176 operable to be engaged by the user/dealer to initiate the search from the selected customer database for the one or more prospective customers that meet the criteria as defined by the previous vehicle and vehicle financial transaction parameters 108 which the user/dealer has selected to input. As noted, only one or more parameters need to be inputted in order for the search process to identify a group of prospective customers. Additionally, the previous vehicle/transaction identifier/prospective customer identifier UI 100 also includes a clear key 178 operable to be engaged to clear all of the fields on the UI 100 in order to conduct a further search of prospective customers.

Referring to FIG. 6, a schematic example of a group of prospective customers User Interface (UI) 180 is shown, in accordance with another present embodiment of the invention. The display panel 180 may be displayed upon engaging the search key 176 in the previous vehicle/transaction identifier/prospective customer identifier UI 100 (shown in FIG. 5). The UI 180 includes a listing of prospective customers based on the customers meeting the criteria defined in the previous vehicle/transaction identifier/prospective customer identifier UI 100. The display panel 180 may include customer number field(s) 182 for displaying one or more assigned customer numbers; customer name fields 184 for displaying a first, last and other name associated with the customer; a FED contact field 186 for identifying the customer as being contactable under the federal telemarketing harassment laws; a last contact date field 188 for indicating the last date that the prospective customer was contacted/solicited; an email address filed 190 for identifying the customer's known email address; and telephone number fields 192 for identifying one or more telephone numbers associated with the customer.

The display panel 180 may also include proposal information fields 194 for identifying specifics related to the vehicle proposal, proposed vehicle information fields 196 for identifying the make, model, year, etc. of the proposed vehicle being offered; current financial transaction fields 197 for indicating the specifics related to the current ongoing financial transaction obligations and current vehicle information fields 198 for indicating the make, model, year, etc. of the current customer vehicle. In accordance with certain embodiments, the fields depicted in UI 180 may be sortable fields such that clicking-on or otherwise activating the field title provides for a sort listed within that particular field.

Referring to FIG. 7, a block diagram is depicted of an example of a retail/sales vehicle selection and sales parameter identifier User Interface (UI) 200 included in the customer marketing module 20, according to a present embodiment of the invention . . . . The UI 200 includes a sales key 206, a lease key 208 and an equity key 210 for the user/dealer to select between sales vehicle selection, lease vehicle selection and equity UIs. In the illustrated embodiment of FIG. 7, the user/dealer has engaged the sales key 206 to display the associated retail/sales vehicle selection and sales transaction parameter identifier UI 200. The fields shown in FIG. 7 are by way of example only and, thus other fields may be added to or deleted from the UI 200 without departing from the inventive concepts herein disclosed.

The UI 200 includes vehicle parameters 212 that provide entry fields for identifying the vehicle that the user/dealer desires to proposal to the group of prospective customers. The vehicle parameters may include, but are not limited to, a manufacturer field 214, a model field 216, a year field 218, a model number field 220 and other attribute field 222, such as a body type field or the like. The vehicle parameter fields may provide for a drop-down window for selecting a parameter for drop-down list or the field may require data entry, such as the model number field 220. The drop-down lists may be presented based on a subsequent selection, for example, selection of a vehicle manufacturer may dictate which model drop-down list appears and the selection of the model may dictate which year drop-down lists appears. In addition, vehicle parameters 212 may include a choose new vehicle key 224 that is operable to be engaged to display a listing of new vehicles currently available from the dealership, from the dealership network and/or from the entire manufacturer base of dealerships and a pre-owned vehicle key 226 that is operable to be engaged to display a listing of pre-owned vehicles currently available from the dealership, the dealership network and/or from the entire manufacturer base of dealerships.

The UI 200 also includes proposed retail/sales transaction variable parameters 228. The proposed transaction parameters 228 include sales price field 230 to provide for the user/dealer to input a desired sale price, finance/interest rate field 232 to provide for the user/dealer to input a current vehicle program interest rate, term field 234 to provide for the user/dealer to input a current vehicle program term, a minimum profit field 236 that allows for the user/dealer to input a desired profit amount on the sale of the proposed vehicle and a manufacturer incentive field 238 that allows the user/dealer to input the vehicle incentive program currently being offered.

The UI 200 may also include a ballpark/estimated monthly payment indicator 240 that displays a calculated monthly payment estimate based on inputted data, such as sales price, finance rate, and term data entered in the proposed transaction parameter fields. Additionally, UI 200 may include a book-value selector 242 that allows the user/dealer to select the book value type to use in determining the market value of the prospective customers current vehicle. The book-value selector may be in the form of a drop-down window that displays all available book-value options and allows the user/dealer to select from the displayed options.

UI 200 may also include prospective customer transaction variable parameters 244. The prospective customer transaction variable parameters 244 may include, but are not limited to, a variance amount above/below the current monthly payment amount field 246 that allows for the user/dealer to define an amount below/above the current monthly amount that the identified prospective customers may find acceptable. Additionally, parameters 244 may include a check box 248 for indicating whether a prospective customer requires positive equity (i.e., sales/trade-in value exceeds the amount owed) to be further considered as prospective customer to which the proposal will be offered. If check box 248 is engaged, minimum equity field 250 allows for the user/dealer to define the minimum equity that the prospective customer must have in the current vehicle. It should be noted that the prospective customer transaction variable parameters 244 define further criteria for prospective customer inclusion in the group of prospective customers to which the proposal will be offered to. Thus, the search of prospective customers that results from the prospective customer identifier UI (FIG. 5) may be further limited based on the user/dealer defined prospective customer variable parameters 244.

Additionally, UI 200 may optionally include a Loan To Value (LTV) program parameters 252. The LTV program parameters 252 may include, but are not limited to the financial institution field 254 that allows for the user/dealer to input a financial institution name and a LTV program name field 256 that allow for the user/dealer to input a LTV program name. Alternatively, the LTV program parameters 252 may include an LTV program choose key 258 operable to be engaged by the user/dealer to provide for a listing of LTV programs to choose from.

UI 200 also includes a process key 260 that may be engaged by the user/dealer after all of the desired fields in UI 200 have inputs. The process key 260 will initiate the determination of the sales proposal for each of the prospective customers in the identified group. The determination process may include automatically determining the book value of the current vehicle of the prospective customer, determining an estimated payoff amount for the current prospective customer's vehicle, determining estimated sales taxes, determining an estimated financed amount and determining an estimated monthly payment. Once the determinations have been completed and a proposal determined for each of the prospective customers, a report is generated for each of the prospective customers that includes the sales proposal. The clear key 262 allows the user/dealer to clear all of the fields in UI 200 to initiate new search criteria for a proposed vehicle sale.

It should be noted that while the customer marketing module 20 generally implements UI 200 in conjunction with UI 100 to identify prospective customers to target for vehicle proposals, identify the vehicle to offer those prospective customers and the terms of the new proposal, it is possible, and within the inventive concepts herein disclosed, to implement UI 200 for the sole purpose of identifying or locating a specific vehicle and the terms associated with a proposal for the vehicle. For example, if the customer has no prior relationship with the dealership or the customer has no outstanding financial obligation on their current vehicle, the user/dealership may desire to use the vehicle identification aspect of the customer marketing module 20 to locate a vehicle desired by the customer and to identify the terms of a financial proposal associated with the located vehicle. Such implementation of UI 200 and the concept of vehicle identification are especially suited in instances in which the customer marketing module 20 is used across multiple dealerships or an entire manufacturer, such that the vehicles in the database extend beyond just one dealership.

Referring to FIG. 8, a block diagram is depicted of an example of a lease vehicle selection and lease transaction parameter identifier User Interface (UI) 300 included in the customer marketing module 20, according to a present embodiment of the invention. The UI 300 includes a sale key 306, a lease key 308 and an equity key 310 for the user/dealer to select between sale vehicle selection, lease vehicle selection and equity. In the illustrated embodiment of FIG. 8, the user/dealer has engaged the lease key 308 to display the associated lease vehicle selection and lease transaction parameter identifier UI 300. The fields shown in FIG. 8 are by way of example only and, thus other fields may be added to or deleted from the UI 300 without departing from the inventive concepts herein disclosed.

The UI 300 includes vehicle parameters 312 that provide entry fields for identifying the vehicle that the user/dealer desires to propose to the group of prospective customers. The vehicle parameters may include, but are not limited to, a manufacturer field 314, a model field 316, a year field 318, a model number field 320 and other attribute field 322, such as a body type field or the like. The vehicle parameter fields may provide for a drop-down window for selecting a parameter for drop-down list or the field may require data entry, such as the model number field 320. The drop-down lists may be presented based on a subsequent selection, for example, selection of a vehicle manufacturer may dictate which model drop-down list appears and the selection of the model may dictate which year drop-down lists appears. In addition, vehicle parameters 312 may include a choose vehicle key 324 that is operable to be engaged to display a listing of vehicles currently available from the dealership, from the dealership network or from the entire manufacturer base of dealerships.

The UI 300 also includes proposed lease transaction variable parameters 326. The proposed lease transaction parameters 326 include a manufacturer's suggested retail price (MSRP) field 328 to provide for the user/dealer to input the MSRP, a base cap cost field 330 to provide for the user/dealer to input the actual sale price proposed to retail customers, a minimum profit field 332 to provide for the user/dealer to input desired minimum profit for the dealership for the lease period, an acquisition fee field 334 that allows for the user/dealer to input the acquisition cost associated with the proposed lease vehicle, and a manufacturer incentive field 336 that allows the user/dealer to input the vehicle incentive program currently being proposed. The proposed lease transaction variable parameters 326 also include a cash down field 338 that allows the user/dealer any customer cash needed for the lease, a tax, title and documentation field 340 that allows the user/dealer to input, or alternatively automatically display, the tax, title and documentation fees associated with the proposed lease vehicle, and the adjusted cap cost field 342 that displays a calculated cap cost based on other inputted proposed lease transaction parameters. In alternative embodiments, the title, documentation and/or tax may be listed in individual fields.

The proposed lease transaction variable parameters 326 may also include residual percentage field 344 that allows the user/dealer to input a residual percentage that represents the residual value of the proposed vehicle after the completion of the lease term. The residual field 346 displays the residual value of the proposed lease vehicle. Parameters 326 also include term field 348 that allows the user/dealer to input a lease contract term and money factor percentage field 350 that allows the user/dealer to input the money factor percentage associated with the lease contract. The money factor field 352 displays the actual money factor used in the lease contract. Money factor is the alternative means of presenting the amount of interest charged on a lease with monthly payments.

The UI 300 may also include a ballpark/estimated monthly payment indicator 354 that displays a calculated monthly payment estimate based on inputted data, such as Manufacturer's Suggested Retail Price (MSRP), residual rate, payment term, money factor and the like the proposed lease transaction parameter fields. Additionally, UI 300 may include a book-value selector 356 that allows the user/dealer to select the book value type to use in determining the market value of the prospective customers current vehicle. The book-value selector may be in the form of a drop-down window that displays all available book-value options and allows the user/dealer to select from the displayed options.

UI 300 may also include prospective leasee/customer transaction variable parameters 358. The lessee variable transaction parameters 358 may include, but are not limited to, a variance amount above/below the current monthly payment amount field 360 that allows for the user/dealer to define an amount/below above the current monthly amount that the group of prospective customers may find acceptable. Additionally, parameters 358 may include a check box 362 for indicating whether a prospective customer requires positive equity to be further considered as prospective customer to which the proposal will be offered. If check box 362 is engaged, minimum equity field 364 allows for the user/dealer to define the minimum equity that the prospective customer must have in the current vehicle. It should be noted that the prospective customer transaction variable parameters 358 define further criteria for prospective customer inclusion in the group of prospective customers to which the proposal will be made. Thus, the search of prospective customers that results from the prospective customer identifier UI (FIG. 5) may be further limited based on the user/dealer defined prospective customer variable parameters 358.

Additionally, UI 300 may optionally include a Loan To Value (LTV) program parameters 366. The LTV program parameters 366 may include, but are not limited to, the financial institution field 368 that allows for the user/dealer to input a financial institution name and a LTV program name field 370 that allow for the user/dealer to input a LTV program name. Alternatively, the LTV program parameters 366 may include an LTV program choose key 372 operable to be engaged by the user/dealer to provide for a listing of LTV programs to choose from.

UI 300 also includes a process key 374 that may be engaged by the user/dealer after all of the desired fields in UI 300 have inputs. The process key 374 will initiate the determination of the sales proposal for each of the prospective customers in the identified group. The determination process may include automatically determining the book value of the current vehicle of the prospective customer, determining an estimated monthly finance charge, determine a proposed finance charge, determine total sales tax, determine an estimated monthly depreciation charge and determine and set the lease turn-in alert. Once the determinations have been completed and a proposal determined for each of the prospective customers, a report is generated for each of the prospective customers that includes the lease proposal. The clear key 376 allows the user/dealer to clear all of the fields in UI 300 for the purpose of inputting new search criteria into fields shown in UI 300.

Referring to FIG. 9 a block diagram is depicted of an example of an equity vehicle selection User Interface (UI) 400 included in the customer marketing module 20, according to a present embodiment of the invention. The UI 400 includes a sale key 406, a lease key 408 and an equity key 410 for the user/dealer to select between sale vehicle selection, lease vehicle selection and equity. In the illustrated embodiment of FIG. 9, the user/dealer has engaged the equity key 410 to display the associated equity vehicle selection UI 400. The equity vehicle selection UI 400 provides for vehicle proposals absent a previous sale/lease and/or ongoing financial obligation with the dealership. The fields shown in FIG. 9 are by way of example only and, thus other fields may be added to or deleted from the UI 400 without departing from the inventive concepts herein disclosed.

UI 400 includes a book-value selector 412 that allows the user/dealer to select the book value type to use in determining the market value of the prospective customers current vehicle. The book-value selector may be in the form of a drop-down window that displays all available book-value options and allows the user/dealer to select from the displayed options.

UI 400 may include a check box 414 for indicating whether a prospective customer requires positive equity to be further considered as prospective customer to which the proposal will be offered. If check box 414 is engaged, minimum equity field 416 allows for the user/dealer to define the minimum equity that the prospective customer must have in the current vehicle. Payoff-greater-than field 416 allows for the user/dealer to input an amount for which the payoff must greater than UI 400 may optionally include a Loan To Value (LTV) program parameters 420. The LTV program parameters 420 may include, but are not limited to, the financial institution field 422 that allows for the user/dealer to input a financial institution name and a LTV program name field 424 that allow for the user/dealer to input a LTV program name. Parameters 420 may also include a check box 426 for indicating whether a prospective customer requires positive equity to be further considered for a LTV program. If check box 426 is engaged, minimum equity field 428 allows for the user/dealer to define the minimum equity that the prospective customer must have in the current vehicle. Alternatively, the LTV program parameters 420 may include an LTV program choose key 430 operable to be engaged by the user/dealer to provide for a listing of LTV programs to choose from.

Additionally, UI 400 includes a process key 432 that may be engaged by the user/dealer after all of the desired fields in UI 400 have inputs. The process key 432 will initiate the determination of the sales proposal for the prospective customer. The determination process may include automatically determining.

Referring to FIG. 10, a block diagram is depicted of a retail/sales report 500 generated as a result of determining a targeted and customized sales proposal for a prospective customer, in accordance with an embodiment of the present invention. The retail/sales report 500 is generally used for internal purposes and therefore may be limited in distribution to sales personnel and other employees of the dealership. Information found in the retail report 500 will form the basis for the information presented in the vehicle proposal to the prospective customer. As previously noted, the proposal to the prospective customer may take the form of an electronic proposal, such as an email proposal, a text proposal or the like, a mail proposal, a telephone proposal and/or an in-person proposal.

The retail report 500 may include a proposal qualification status indicator 502 that indicates the qualification status of the customer based on predetermined qualification criteria. For example, in one embodiment the qualification status indicator may indicator that a customer is a "hot" qualifier, "medium" qualifier or "cold" qualifier based on the predetermined qualification criteria.

The report 500 also includes customer information 504 that identifies the customer and contact information associated with the customer. For example, the customer information 504 may include, but is not limited to, a name 506, an address 508 telephone numbers 510, an email address 512, a customer number 514 associated with a previous vehicle transaction and any other information 516, such other electronic communication addresses, number of previous new and/or pre-owned purchases/leases with the dealership, amount of previous purchases/leases, previous vehicle services at the dealership, amount of the services or the like. The customer information 504 may also include the federal contact status 518, which indicates if the customer currently has do-not-call status. The available contact information for any one prospective customer may form the basis for determining which means is used to communicate the vehicle proposal to the prospective customer.

In the instance in which the sales report 500 is generated for a service customer, the other information 516 may include, but is not limited to, the pending service appointment number, the service appointment date, the service appointment time, the name of the service appointment advisor or the like The retail report 500 may also include information 520 related to the previous/ongoing financial transaction contract associated with the prospective customers current vehicle. This information may include current vehicle information 522, such as the new/pre-owned status, make, model, year, model number, body type, Vehicle Identification Number (VIN), and the estimated miles on the vehicle or the like, a transaction number 524 associated with the previous vehicle transaction, a financial institution 526 that is carrying the current financial obligation and a salesperson and/or financing manager 528 involved in the previous vehicle transaction. The information 520 may also include transaction information 530, such as, but not limited to, the sale price 532, the amount of the sale price financed 534, the term of the loan 536, the finance rate of the loan 538 and the monthly payment 540 for the loan. Additionally, information 520 may also include current vehicle value information 542, such as the book value used 544 and the determined book value amount 546. The previous/ongoing financial transaction contract information 520 may also include an estimated payoff 548 and a last payment due date 550. The estimated payoff amount 548 is determined as part of the vehicle proposal determination and is based on the current term, the finance rate, the amount financed and the number of estimated payments made since the inception of the sales contract.

The retail report 500 also includes information 552 related to the vehicle proposal offer. The vehicle proposal information 552 may include vehicle information 554, such as the make, model, year, model number, body style or the like, the proposed sale price 556, dealer incentive 558, the document fees 560, the title fee 562, the license fee 564 and the taxes 566. The vehicle proposal information 552 may also include the minimum profit desired by the dealer 568, the current monthly payment 570 and the proposed monthly payment amount 572 that is calculated as part of the determination of the vehicle proposal and is based on the proposed finance amount, the term of the loan and the finance rate. Additionally, information 552 may include finance amount 574, which may also be determined as part of the determination of the vehicle proposal and is based on sale price, minimum desired profit, estimated payoff amount, dealer incentives, book value of the current vehicle and tax, title license and documentation fees. Thus, the vehicle proposal information 552 may also include the LTV institution and percentage 576, the finance rate 578, the proposed term 580, and the variance amount above the current monthly payment 582.

Referring to FIG. 11, a block diagram is depicted of a lease report 600 generated as a result of determining a targeted and customized lease proposal for a prospective customer, in accordance with an embodiment of the present invention. The lease report 600 is generally used for internal purposes and therefore may be limited in distribution to sales personnel and other employees of the dealership. Information found in the lease report 600 will form the basis for the information presented in the vehicle proposal to the prospective customer. As previously noted, the proposal to the prospective customer may take the form of an electronic proposal, such as an email proposal, a text proposal or the like, a mail proposal, a telephone proposal and/or an in-person proposal.

The lease report 600 may a proposal qualification status indicator 602 that indicates the qualification status of the customer based on predetermined qualification criteria. For example, in one embodiment the qualification status indicator may indicator that a customer is a "hot" qualifier, "medium" qualifier or "cold" qualifier based on the predetermined qualification criteria.

The lease report additionally includes customer information 604 that identifies the customer and contact information associated with the customer. For example, the customer information 604 may include, but is not limited to, a name 606, an address 608, telephone numbers 610, an email address 612, a customer number 614 associated with a previous vehicle transaction and any other information 616, such other electronic communication addresses number of previous new and/or pre-owned purchases/leases with the dealership, amount of previous purchases/leases, previous vehicle services at the dealership, amount of the services or the like. The customer information 604 may also include the federal contact status 618, which indicates if the customer currently has do-not-call status. The available contact information for any one prospective customer may form the basis for determining which means is used to communicate the vehicle proposal to the prospective customer.

The lease report 600 may also include information 620 related to the previous/ongoing financial transaction contract associated with the prospective customers current vehicle. This information may include current vehicle information 622, such as the make, model, year model number, body type or the like, a transaction number 624 associated with the previous vehicle transaction, a financial institution 626 that is carrying the current financial obligation and a salesperson 628 involved in the previous vehicle transaction. The information 620 may also include transaction information 630, such as, but not limited to, the lease price 632, the term of the lease 634, the net cap cost 636, the money factor 638 of the current lease and the monthly payment 640 for the current lease. Additionally, information 620 may also include current vehicle value information 642, such as the book value used 644, the determined book value amount 646, the current residual 648 and the estimated residual amount 650. The previous/ongoing financial transaction contract information 620 may also include an estimated payoff 652 and a last payment due date 654.

The lease report 600 also includes information 660 related to the vehicle proposal. The vehicle proposal information 660 may include vehicle information 662, such as the make, model, year, model number, body style or the like, the proposed sale price 664, and the taxes 666. The vehicle proposal information 660 may also include the current monthly finance amount 668 and proposed monthly finance amount 670 that is calculated as part of the determination of the vehicle proposal and is based on the sum of the proposed vehicle monthly depreciation fee, plus the monthly finance fee. Additionally, information 660 may include, the net cap cost 672, the proposed term 674, the minimum profit desired by the dealer 676 and the incentive 678 associated with this lease. In addition, the proposed vehicle proposal information 660 may include variance amount above the current monthly payment 680.

Referring to FIG. 12, a block diagram is depicted of an equity report 700 generated as a result of determining equity for a prospective customer, in accordance with an embodiment of the present invention. The equity report 700 is generally used for internal purposes and therefore may be limited in distribution to sales personnel and other employees of the dealership. Information found in the equity report 700 will form the basis for the information presented in the vehicle proposal to the prospective customer. As previously noted, the proposal to the prospective customer may take the form of an electronic proposal, such as an email proposal, a text proposal or the like, a mail proposal, a telephone proposal and/or an in-person proposal.

The equity report 700 includes customer information 702 that identifies the customer and contact information associated with the customer. For example, the customer information 702 may include, but is not limited to, a name 704, an address 706 telephone numbers 708, an email address 710, a customer number 712 associated with a previous vehicle transaction and any other information 714, such other electronic communication addresses, number of previous new and/or pre-owned purchases/leases with the dealership, amount of previous purchases/leases, previous vehicle services at the dealership, amount of the services, last payment date or the like. The customer information 702 may also include the federal contact status 716, which indicates if the customer currently has do-not-call status. The available contact information for any one prospective customer may form the basis for determining which means is used to communicate the vehicle proposal to the prospective customer.

The equity report 700 may also include information 720 related to the previous financial transaction contract associated with the prospective customer's current vehicle. This information may include current vehicle information 722, such as the new/pre-owned status, make, model, year, model number, body type, Vehicle Identification Number (VIN), and the estimated miles on the vehicle or the like, a transaction number 724 associated with the previous vehicle transaction, a financial institution 726 that is carrying the current financial obligation and a salesperson and/or financing manager 728 involved in the previous vehicle transaction. The information 720 may also include transaction information 730, such as, but not limited to, the sale price 732, the amount of the sale price financed 734, the term of the loan 736, the finance rate of the loan 738 and the monthly payment 740 for the loan. Additionally, information 720 may also include current vehicle value information 742, such as the book value used 744 and the determined book value amount 746. The previous/ongoing financial transaction contract information 520 may also include an estimated payoff 748 and a last payment due date 750. The estimated payoff amount 748 is determined as part of the vehicle proposal determination and is based on the current term, the finance rate, the amount financed and the number of estimated payments made since the inception of the sales contract.

The equity report 700 additionally includes equity information 752 which includes a front amount 754, a back amount 756, a total amount 758 and an estimated equity amount 760.

Referring to FIG. 13 a block diagram is illustrated that depicts an example of a joint proposal report and prospective customer communication history User Interface (UI) 800, in accordance with an embodiment of the present invention. One portion of the UI 800 may include a depiction of the retail report 500, lease report 600 or equity report 700 shown in FIGS. 10, 11 and 12, respectively.

Another portion of UI 800 includes the prospective customer proposal communication mechanism and history 802. Input key 804 provides for automatically generating and communicating an email message to the prospective customer that includes the proposal or portions of the proposal detailed in the report 500, 600 or 700 shown in UI 800. Likewise, input key 806 provides for automatically generating and communicating a text/Short Message Service (SMS) to the prospective customer that includes the proposal or portions of the proposal detailed in the report 500, 600 or 700 shown in UI 800. It should be noted that UI 800 may include other input keys for automatically generating and communicating other forms of known or future known electronic communication. Additionally, in specific embodiments the input keys 804 or 806 may only be displayed or configured to be activated if the prospective customer has previously affirmatively agreed to be contacted by the user/dealer for the purpose of providing such proposals. In other embodiments, the input keys 804 and 806 may only be displayed or configured to be activated if the prospective customer has not previously received a proposal communication within a predetermined time period. For example, the marketing module 20 may be configured to only allow a proposal to be communicated once every thirty days. Thus, if a proposal has been communicated within the previous 30 days either the input keys will not be displayed in UI 800 or the input keys may not be activated.

Additionally, the prospective customer proposal communication mechanism and history 802 portion of UI 800 includes history field 808 that displays the communication history for the prospective customer. The UI 800 may be configured to automatically create and display an entry in history field 808 upon engaging either the send email input key 804 or the send text input key 806. In other embodiments, the user may be tasked with creating entries in the history field 808 based on activating input key 804 or 808 or communicating the proposal to the prospective customer in another manner, such via postal mail, telephone call, face-to-face or the like. Additionally, in those embodiments in which the input keys 804 and 806 are not restricted in use based on previous proposal communication entries in the history field 806 may serve the basis for making a decision on providing a further proposal communication. In those embodiments in which the history entry is not generated automatically or if the automated entry requires further information, a user may implement input fields 810, 812 and 814 to supply the requisite and/or additional information. Input field 810 provides for entry of the user/sales associate name, input field 812 provides for entry of the date of the communication and input field 814 provides for entry of comments related to the communication proposal.

Turning the reader's attention to FIG. 14, a flow diagram is presented of a method 1000 for generating vehicle proposals, in accordance with an embodiment of the present invention. At Event 1002, an input is received, at a predetermined UI, such as the UI discussed in relation to FIG. 5, to select a database for the searching of prospective customers. The selected database may be associated with a specific dealership business unit, a grouping of dealership business units, a manufacturer or the like. In one embodiment the selected database is further defined as a previous customer database, such that prospective customers come from a pool of previous purchase, lease and/or service customers.

At Event 1004, input(s) are received, typically at the same predetermined UI associated with Event 1102, which selects one or more vehicle type parameters for the vehicle currently owned/leased by the prospective customers. The current vehicle type parameters may include, but are not limited to, make, model, year, model number, body type and the like. By selecting one or more current vehicle type parameters the prospective customer search is limited to those customers currently under a financial obligation, e.g., a loan or a lease, associated with the selected type of vehicle. For example, if the user/dealer selects Make—Honda, Model—Accord and Year—2006, the prospective customer search is limited to those prospective customers currently having a financial obligation associated with a 2006 Honda Accord.

At Event 1006, input(s) are received, typically at the same predetermined UI associated with Events 1002 and 1004, that selects one or more current or ongoing financial obligation parameters. Financial obligation parameters may include, but are not limited to, a minimum and/or maximum finance rate, a minimum and/or maximum monthly payment amount, the year the financial obligation started, the year the financial obligation is due to end, a minimum payment term, a maximum payment term, a minimum money factor, a maximum money factor and the salesperson associated with the previous vehicle transaction. In this regard, by selecting one or more financial obligation parameters the prospective customer search is limited to those customers currently under a financial obligation meeting the selected financial obligation criteria. It should be noted that in certain embodiments, only Event 1004 or Event 1006 needs to occur. In other words, the user/dealer may only limit the search of prospective customers based on vehicle type or current financial obligation parameters, as opposed to limiting the search for prospective customers based on both vehicle type and current financial obligation parameters.

At Event 1008, an input is received to search the selected database for prospective customers based on the selected vehicle type parameters and/or selected previous financial obligation parameters. At Event 1010, based on the input at Event 1008, a determination is made as to which customers match or meet the selected vehicle type criteria and/or selected previous financial obligation parameters. Those customers that meet or match the selected vehicle type criteria and/or selected previous financial obligation parameters form a group of prospective customers that may be targeted for customized marketing of a vehicle proposal. At optional Event 1012, a listing of the customers that match or meet the selected vehicle type criteria and/or selected previous financial obligation parameters may be displayed. An example of the formatting of a customer listing panel is shown and described in relation to FIG. 6.

At Event 1014, input(s) are received, at a predetermined UI such as the UIs discussed in relation to FIGS. 7 and/or 8, that select one or more proposed vehicle type parameters. The proposed vehicle is the vehicle that the user/dealer desires to propose for sale or lease to the group of prospective customers and is the vehicle for which the user/dealer is determining a customized vehicle proposal for each of the prospective customers. The proposed vehicle type parameters may include, but are not limited to, make, model, year, model number, body type and the like. Alternatively, the user/dealer may choose to select the proposed vehicle from a listing of available vehicles.

At Event 1016, input(s) are received, typically at the same predetermined UI associated with Event 1114, that select or define one or more proposed vehicle transaction parameters. The selected or defined proposed vehicle transaction parameters will differ depending on whether the proposal is being structured as a sale or as a lease. For a sale, the vehicle transaction parameters may include, but are not limited to, a desired sale price, current financial rate being offered, a payment term, a minimum desired profit on the sale, a manufacturer incentive associated with the sale, a variance amount above the current payment amount and a minimum equity position associated with the current vehicle. For a lease, the vehicle transaction parameters may include, but are not limited to, a Manufacturer's Selected Retail Price (MSRP), a base cap cost, a minimum desired profit on the lease, acquisition fees, a minimum cash down amount, a residual rate, a term of lease, money factor, a variance amount above the current payment amount and/or a minimum equity position associated with the current vehicle. It should be noted that selection of the vehicle and selection of certain variable vehicle transaction parameters, such as the variance amount above the current payment amount and the minimum equity position associated with the current vehicle, will further limit the group of prospective customers that will be targeted with a customized vehicle proposal.

At optional Event 1018, a proposed monthly payment estimate is determined and, optionally, displayed on the UI, for the purpose of making the user/dealer aware of what the monthly payment is estimated based on other parameters for the proposed vehicle that will be offered to the prospective customers. The proposed monthly payment estimate is determined based on information selected or defined at Event 1016, such as for a sale, sales price, finance rate and term, and for a lease, residual, term and money factor along with a calculated adjusted cap cost.

At Event 1020, an input is received, typically at the same predetermined UI associated with Event 1014, which selects a book value to be used in determining the market value of the prospective customer's current vehicle. The estimated market value of the customer's current vehicle will be determined during the process that determines the customized vehicle proposal for each of the prospective customers.

At Event 1022, an input is received, typically at the same predetermined UI associated with Event 1014, to process the vehicle proposal for each of the identified prospective customers. At Event 1024, a customer vehicle market value and/or data effecting vehicle market value is retrieved from an external database, such as BlackBook®, CarFax® or the like, for each of the prospective customers. The customer vehicle market value may be based on the selected book value (Event 1020) and any other retrieved information such as service information that may indicate recent mileage on the vehicle or the like. The customer vehicle market value is subsequently used to determine the vehicle proposal that will be offered to each of the prospective customers.

At Event 1026, a vehicle proposal is determined for each of prospective customers. The flow diagram 1100 of FIG. 15, discussed infra., describes an exemplary vehicle sales proposal determination process and the flow diagram 1200 of FIG. 16, discussed infra., describes an exemplary vehicle lease proposal determination process. At Event 1028, based on the determination of vehicle proposals, vehicle proposal reports are generated for each of the prospective customers. In accordance with an embodiment of the present invention, the vehicle proposal reports may be automatically electronically communicated to designated individuals/salespeople within the sales company. In addition, the system may provide for automatically generating and electronically communicating, via e-mail, text message or the like the proposed offer to each of the prospective customers that have an address or number associated with an electronic delivery mechanism. In other embodiments, the system may provide for generating prospective customer letters, through use of a letter template, that include the proposal and that are subsequently communicated to the prospective customer via postal service or the like.

Referring to FIG. 15, a flow diagram is presented of a method 1100 for determining a targeted and customized retail/sales proposal for identified prospective customers, in accordance with embodiments of the present invention. The events herein described in relation to FIG. 15 are performed for each identified prospective customer so as to create customized sales proposals for each of the identified prospective customers. At Event 1102, an estimated payoff on the current vehicle is determined based on the current customer term, the finance rate of the ongoing financial obligation, the amount financed and the number of estimated payments made since the contract data. At Event 1104, taxes are determined for the proposed vehicle sale. The determined taxes are based on the sales price of the vehicle, the vehicle market book value and the state sales tax rate. The result of the determination may then be checked to see if it is within the customer's state tax allowable limits. If the determined tax is higher than the maximum allowable tax, the maximum allowable tax will be used in the proposal as the vehicle tax.

At Event 1106, an estimated finance amount for the proposed vehicle is determined. The estimated finance amount is based on information inputted by the user/dealer related to the proposed vehicle transaction parameters. This information includes, the desired sales price, the minimum profit on the sale, the calculated estimate payoff on the current vehicle (Event 1102), the manufacture's incentive, the book value of the current vehicle, and the taxes, title, license and documentation fees associated with the proposed vehicle.

At Event 1108, an estimated monthly payment is determined based on determined estimated finance amount (Event 1106), the identified term of the loan and the finance rate of the loan.

Referring to FIG. 16, a flow diagram is presented of a method 1200 for determining a targeted and customized lease proposal for identified prospective customers, in accordance with embodiments of the present invention. The events herein described in relation to FIG. 13 are performed for each identified prospective customer so as to create customized lease proposals for each of the identified prospective customers. At Event 1202, a total sales tax is determined for the proposed vehicle based on the MSRP price of the vehicle, the vehicle market book value and the state sales tax rate. The result of the determination may then be checked to see if it is within the customer's state tax allowable limits. If the determined tax is higher than the maximum allowable tax, the maximum allowable tax will be used in the proposal as the vehicle tax.

At Event 1204, an estimated monthly finance charge is determined. The estimated monthly finance charge is based on the proposed financed amount, proposed residual value, term and money factor. The monthly finance charge is calculated as the sum of the proposed vehicle monthly depreciation fee, plus the monthly finance fee. It should be noted that this calculation does not take into account sales taxes. The monthly depreciation fee is calculated as the proposed finance amount (adjusted cap cost, item 638 of FIG. 8) minus the variable proposed residual (item 642 of FIG. 8) divided by the lease term (item 644 of FIG. 8). The monthly finance fee is calculated as the proposed financed amount (adjusted cap cost, item 638 of FIG. 8) plus the proposed vehicle residual (item 642 of FIG. 8) multiplied by the money factor amount (item 648 of FIG. 8).

At Event 1206, a proposed finance charge is determined based on the calculated estimated monthly charge (Event 1204) and the term of the lease. At Event 1208 a proposed monthly depreciation charge is determined based on the proposed depreciation (i.e., the residual amount) and the term of the lease. The monthly depreciation fee is calculated as the proposed finance amount (adjusted cap cost, item 638 of FIG. 8) minus the variable proposed residual (item 642 of FIG. 8) divided by the lease term (item 644 of FIG. 8).

At Event 1208, a lease turn-in alert is determined. The lease turn-in alert is based on the estimated payoff amount and the estimated money owed. The turn-in warning is activated when the estimated money owed is less than the negative equity (i.e., the payoff amount minus the vehicle market value).

Thus, present embodiments provide for methods, apparatus and computer program products for targeted and customized marketing to vehicle customers and, specifically in some embodiments, vehicle customers having a previous relationship with the dealership or manufacturer implementing the marketing campaign. The embodiments of the invention herein disclosed provide for efficient identification of previous customers based on their current vehicle and/or their previous, and in some instances, ongoing financial obligation related to the current vehicle. A new or pre-owned vehicle is identified and a financial transaction proposal, such as a sales or lease proposal, is generated for one or more of the identified previous customers based on customers meeting criteria associated with variable parameters of the proposed transaction.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for a user to determine potential customers of a vehicle to contact comprising:

determining, using a computing device, a customer whose vehicle is either scheduled for vehicle service or that is currently at a location for vehicle service;

determining one or more first vehicles that are existing and currently available to the user that the user can offer to potential customers;

identifying, using a computing device, one of the first vehicles that is a similar make and model as the customer vehicle;

receiving, by a computing device, customer information and market information wherein said market information includes an estimated market value for the customer vehicle and at least one of an interest rate, a manufacturer's incentive that is available for the first vehicle, and a sales price of the first vehicle;

generating, by a computing device, a report if the first vehicle is of the similar make and model as the customer vehicle, such report including the customer information and an estimated proposal for the first vehicle based at least in part on said estimated market value of the customer vehicle and the market information; and determining that the customer is a potential customer to contact regarding the first vehicle based on said report.

2. The method of claim 1, wherein identifying further comprises identifying, using the computing device, whether the customer vehicle is at least one of a same make or a same model as the first vehicle.

3. The method of claim 1, further comprising determining, using a computing device, a variance amount between a current monthly vehicle payment or lease amount for the customer vehicle and the estimated monthly purchase or lease payment for the first vehicle and, wherein generating the report further comprises generating the report, such report additionally comprising the variance amount.

4. The method of claim 1, further comprising determining, using a computing device, the estimated market value for the customer vehicle.

5. The method of claim 4, wherein determining the estimated market value further comprises determining, using the computing device, the estimated market value for the customer vehicle based at least in part on service information associated with the customer vehicle indicating a present condition of the customer vehicle.

6. The method of claim 1, further comprising determining, using a computing device, an equity amount in the customer vehicle based on the estimated market value and current vehicle financing information and, wherein generating the report further comprises generating the report, such report additionally comprising the equity amount.

7. The method of claim 1, further comprising contacting the potential customer regarding the first vehicle on the report while the customer is currently at the location for the vehicle service.

8. The method of claim 7, wherein contacting further comprises contacting the potential customer with at least one of a vehicle sales proposal or a vehicle lease proposal related to the first vehicle while the customer is currently at the location for the vehicle service.

9. An apparatus for a user to determine which potential customers of a vehicle to contact, the apparatus comprising:

a computing platform having at least one processor and a memory in communication with the processor; and a customer marketing module stored in the memory, executable by the processor and configured to:

determine a customer whose vehicle is either scheduled for vehicle service or that is currently at a location for vehicle service;

determine one or more first vehicles that are existing and currently available to the user that the user desires to offer to potential customers, identify at least one of the first vehicles that is similar make and model to the customer vehicle, receive customer information and market information wherein said market information includes an estimated market value for the customer vehicle and at least one of an interest rate, a manufacturer's incentive that is available for the first vehicles, and a sales price of the first vehicles, and generate a report if the first vehicle is of the similar make and model as the customer vehicle, such report including the customer information and an estimated proposal for the first vehicle based at least in part on said estimated market value of the customer vehicle and the market information, wherein the report is a basis for determining that the customer is a potential customer to contact regarding the first vehicle.

10. The apparatus of claim 9, wherein the customer marketing module is further configured to identify whether the customer vehicle is at least one of a same make or a same model as the first vehicle.

11. The apparatus of claim 9, wherein the customer marketing module is further configured to (1) determine a variance amount between a current monthly vehicle payment or lease amount for the customer vehicle and the estimated monthly purchase or lease payment for the first vehicle and (2) generating the report, such report additionally comprising the variance amount.

12. The apparatus of claim 9, wherein the customer marketing module is further configured to determine the estimated market value for the customer vehicle.

13. The apparatus of claim 12, wherein the customer marketing module is further configured to determine the estimated market value based at least in part on service information associated with the customer vehicle indicating a present condition of the customer vehicle.

14. The apparatus of claim 9, wherein the customer marketing module is further configured to (1) determine an equity amount in the customer vehicle based on the estimated market value and current vehicle financing information and (2) generate the report, such report additionally comprising the equity amount.

15. The apparatus of claim 9, wherein the customer marketing module is further configured to generate the report, wherein the report is a basis for determining that the customer is a potential customer to contact regarding the first vehicle while the customer is currently at the location for the vehicle service.

16. The apparatus of claim 15, wherein the customer marketing module is further configured to contact the potential customer with at least one of a vehicle sales proposal or a vehicle lease proposal related to the first vehicle while the customer is currently at the location for the vehicle service.

17. A computer program product that includes a tangible, non-transitory computer-readable medium having sets of codes for causing a computer processor to perform the following steps:

determining a customer whose vehicle is either scheduled for vehicle service or that is currently at a location for vehicle service;

determining one or more first vehicles that are existing and currently available to the user that the user desires to offer to potential customers, identifying at least one of the first vehicles that is similar make and model to the customer vehicle, receiving customer information and market information wherein said market information includes an estimated market value for the customer vehicle and at least one of an interest rate, a manufacturer's incentive that is available for the first vehicles, and a sales price of the first vehicles, and generating a report if the first vehicle is of the similar make and model as the customer vehicle, such report including the customer information and an estimated proposal for the first vehicle based at least in part on said estimated market value of the customer vehicle and the market information, wherein the report is a basis for determining that the customer is a potential customer to contact regarding the first vehicle.

18. The computer program product of claim 17, wherein the step of identifying further comprises identifying whether the customer vehicle is at least one of a same make or a same model as the first vehicle.

19. The computer program product of claim 17, wherein the steps further comprise determining a variance amount between a current monthly vehicle payment or lease amount for the customer vehicle and the estimated monthly purchase or lease payment for the first vehicle and, wherein the step of generating the report further comprises generating the report, such report additionally comprising the variance amount.

20. The computer program product of claim 17, wherein the steps further include determining the estimated market value for the customer vehicle.

21. The computer program product of claim 20, wherein the steps further include determining the estimated market value for the customer vehicle based at least in part on service information associated with the customer vehicle indicating a present condition of the customer vehicle.

22. The computer program product of claim 17, wherein the steps further comprise determining an equity amount in the customer vehicle based on the estimated market value and current vehicle financing information and, wherein the step of generating the report further comprises generating the report, such report additionally comprising the equity amount.

23. The computer program product of claim 17, wherein the step of generating further comprises generating the report, wherein the report is a basis for determining that the customer is a potential customer to contact regarding the first vehicle while the customer is currently at the location for the vehicle service.

24. The computer program product of claim 23, wherein the steps further comprise contacting the potential customer with at least one of a vehicle sales proposal or a vehicle lease proposal related to the first vehicle while the customer is currently at the location for the vehicle service.

* * * * *